United States Patent
Wang et al.

(10) Patent No.: US 11,736,407 B2
(45) Date of Patent: Aug. 22, 2023

(54) METHOD AND APPARATUS FOR LOAD BALANCING AND PACKET RE-SEQUENCING ON NETWORK

(71) Applicant: Huawei Technologies Co., Ltd., Shenzhen (CN)

(72) Inventors: Xiaozhong Wang, Beijing (CN); Wan Lam, Shenzhen (CN); Guang Li, Beijing (CN); Sai Yuan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 152 days.

(21) Appl. No.: 17/216,094

(22) Filed: Mar. 29, 2021

(65) Prior Publication Data
US 2021/0218688 A1 Jul. 15, 2021

Related U.S. Application Data

(63) Continuation of application No. PCT/CN2018/109168, filed on Sep. 30, 2018.

(51) Int. Cl.
*H04L 12/801* (2013.01)
*H04L 47/34* (2022.01)
(Continued)

(52) U.S. Cl.
CPC ............ *H04L 47/34* (2013.01); *H04L 45/745* (2013.01); *H04L 47/125* (2013.01); *H04L 47/2483* (2013.01); *H04L 47/82* (2013.01)

(58) Field of Classification Search
None
See application file for complete search history.

(56) References Cited

U.S. PATENT DOCUMENTS

| 7,263,597 | B2 * | 8/2007 | Everdell | H04L 47/10 709/201 |
|---|---|---|---|---|
| 2006/0221995 | A1 * | 10/2006 | Berkman | H04L 12/5692 370/463 |

(Continued)

FOREIGN PATENT DOCUMENTS

| CN | 101789949 A | 7/2010 |
|---|---|---|
| CN | 102868617 A | 1/2013 |

(Continued)

OTHER PUBLICATIONS

Wei, L., "Achieving Optimized Traffic Sharing over Equal-Cost-Multi-Paths Using LRU-based Caching with Counting Scheme," Acta Electronica Sinica, vol. 36, No. 1, Jan. 2008, With an English Abstract, 7 pages.

*Primary Examiner* — Eunsook Choi
(74) *Attorney, Agent, or Firm* — Conley Rose, P.C.

(57) ABSTRACT

A method for load balancing and packet re-sequencing on a network includes an ingress node that determines an identifier of a destination chip based on a destination address of a packet flow and a forwarding table, allocates, based on the identifier of the destination chip, a channel identifier and a sequence number of each packet that is in the packet flow and that enters a channel, to generate an updated packet flow, where each packet in the updated packet flow includes a packet in a corresponding packet flow, a sequence number of the packet, and the channel identifier, and the updated packet flow is sent in a per-packet load sharing manner.

18 Claims, 12 Drawing Sheets

(51) Int. Cl.
  *H04L 45/745* (2022.01)
  *H04L 47/125* (2022.01)
  *H04L 47/2483* (2022.01)
  *H04L 47/70* (2022.01)
  *H04L 12/851* (2013.01)

(56) References Cited

U.S. PATENT DOCUMENTS

| | | |
|---|---|---|
| 2006/0291404 A1 | 12/2006 | Thubert et al. |
| 2014/0310417 A1 | 10/2014 | Sorenson, III et al. |
| 2015/0146603 A1 | 5/2015 | Wu et al. |
| 2017/0264538 A1 | 9/2017 | Zhang |
| 2017/0339043 A1* | 11/2017 | Sigoure ................ H04L 45/745 |
| 2018/0083790 A1 | 3/2018 | Wijnands et al. |
| 2018/0097720 A1* | 4/2018 | Jaffer ..................... H04L 45/70 |
| 2019/0182367 A1* | 6/2019 | Kim ...................... H04L 63/062 |
| 2019/0280927 A1* | 9/2019 | Filsfils ................... H04L 45/24 |
| 2019/0349307 A1 | 11/2019 | Wu et al. |
| 2020/0044957 A1* | 2/2020 | Allan ................... H04L 41/0816 |
| 2020/0274945 A1* | 8/2020 | Rolando ............. H04L 67/1001 |

FOREIGN PATENT DOCUMENTS

| | | |
|---|---|---|
| CN | 104378297 A | 2/2015 |
| CN | 104486236 A | 4/2015 |
| CN | 108347376 A | 7/2018 |

* cited by examiner

METHOD AND APPARATUS FOR LOAD BALANCING AND PACKET RE-SEQUENCING ON NETWORK

CROSS-REFERENCE TO RELATED APPLICATIONS

The application is a continuation application of International Patent Application No. PCT/CN2018/109168 filed on Sep. 30, 2018, which is hereby incorporated by reference in its entirety.

TECHNICAL FIELD

This application relates to communications technologies, and in particular, to a method and an apparatus for load balancing and packet re-sequencing on a network.

BACKGROUND

On a network, there are usually a plurality of reachable links between a same source device and a same destination device. Currently, a per flow equal-cost multi-path routing (ECMP) method is used to resolve a link load balancing problem. The ECMP may simultaneously use a plurality of links in a network environment in which a plurality of different links reach a same destination address. In this way, not only transmission bandwidth is increased, but also transmitted data of a failed link can be backed up without a latency or a packet loss. In this way, multi-link load balancing and link backup while achieving equal cost. However, due to different sizes of flows, there may be a serious imbalance between load of network links. As a result, bandwidth utilization of a network device is low, and network performance is affected.

Another method is to select a forwarding path for each packet according to a policy. The policy may be random, polling, link load-based selection, or the like. Theoretically, per-packet load balancing can achieve an optimal balancing effect, and can effectively mitigate instantaneous congestion caused by a network burst. However, the per-packet load balancing causes data packet disorder on a receiver side, and this deteriorates service performance.

SUMMARY

This application provides a method and an apparatus for load balancing and packet re-sequencing on a network, to resolve a problem of load imbalance between network links and a problem of data packet disorder.

According to a first aspect, this application provides a load balancing method performed on a network. The method includes the following steps.

A first egress node receives, through a first chip, a plurality of packets included in a first packet flow from a first host connected to the second chip. A destination address of the first packet flow is an address of a third host connected to the first egress node through a first chip. A first ingress node determines an identifier of the first chip based on the first packet flow and a first entry in a forwarding table. The first entry includes the destination address of the first packet flow and the identifier of the first chip. As described above, the first egress node is connected to the host through the chip. One chip may be connected to a plurality of hosts. The first ingress node generates a forwarding table based on an egress node that the first ingress node may reach and a chip on the egress node. An entry in the forwarding table records a correspondence between a destination address of a packet flow and a chip on the egress node. For example, the first entry includes the address of the third host and the identifier of the first chip, indicating that there is a correspondence between the address of the third host and the identifier of the first chip. After determining that the first packet flow is corresponding to the identifier of the first chip, the first ingress node allocates a first channel identifier to the first packet flow based on the identifier of the first chip. The first channel identifier is used to indicate a first channel. The first channel is one of a plurality of channels between the first ingress node and the first chip. In this application, the first ingress node allocates a channel to the packet flow based on a destination chip of the packet flow. For example, if a destination chip of the first packet flow is the first chip, a channel allocated to the first packet flow is one of the plurality of channels between the first ingress node and the first chip. In this application, the first ingress node may allocate, to the first packet flow, an identifier of a default channel corresponding to the identifier of the first chip as the first channel identifier. One default channel is set in the plurality of channels between the first ingress node and the first chip. A priority of the channel is higher than that of another channel. For example, a packet in the default channel is sent before a packet in the another channel. The first ingress node allocates a sequence number to each of the plurality of packets included in the first packet flow. Each sequence number is used to indicate a sequence in which a corresponding packet enters the first channel. The first ingress node generates an updated first packet flow based on the first packet flow. Before sending a packet in the first packet flow, the first ingress node further adds, to the to-be-sent packet, a channel identifier (the first channel identifier) and a sequence number that are allocated to the packet in the foregoing step and that are used on the first egress node to implement packet re-sequencing. Finally, the first ingress node sends a plurality of packets in the updated first packet flow to the first egress node in a per-packet load sharing manner, and the first channel identifier and a sequence number are allocated to each packet in the updated first packet flow. When sending these packets, the first ingress node sends, through a plurality of egress ports based on a sequence of sequence numbers, the plurality of packets included in the updated first packet flow. This implements per-packet load sharing on the updated first packet flow.

In this application, the first ingress node allocates, by flow, a channel to a to-be-sent packet flow. The first ingress node allocates, by packet, a sequence number to a packet in the packet flow. Then, the first ingress node sends the plurality of packets in the updated first packet flow to the first egress node in the per-packet load sharing manner based on the sequence of sequence numbers. This implements load balancing between network links and improves bandwidth utilization.

In a possible implementation, the first ingress node sends a second packet flow to the first egress node, and the second packet flow and the first packet flow have different features. For example, the second packet flow comes from a second host connected to the third chip on the first ingress node, and is received by the third chip. Alternatively, a 2-tuple or a 5-tuple of the second packet flow is different from that of the first packet. In particular, a source address of the second packet flow is different from a source address of the first packet flow, and a destination address of the second packet flow may be different from or the same as the destination address of the first packet flow. However, the second packet flow and the first packet flow are the same, to be specific, both a host to which the second packet flow is sent and a host to which the first packet flow is sent are connected to the first chip on the first egress node. The first ingress node determines the identifier of the first chip based on the second packet flow and a second entry in the forwarding table. Therefore, the first ingress node also allocates the first channel identifier to the second packet flow.

In a possible implementation, the first ingress node sends a third packet flow to the first egress node, and the third packet flow and the first packet flow have different features. For example, a host to which the third packet flow is sent and the host to which the second packet flow is sent are connected to different chips on the first egress node. A destination chip of the third packet flow is a fourth chip, and the destination chip of the first packet flow is the first chip. The first ingress node determines the identifier of the fourth chip based on the third packet flow and the third entry in the forwarding table, which is different from the identifier of the first chip of the first packet flow. Therefore, the first ingress node allocates a third channel identifier to the third packet flow, which is different from the first channel identifier of the first packet flow.

In a possible implementation, when allocating the channel identifier to the first packet flow sent to the first chip, if the first ingress node detects that a rate of a packet transmitted on the first channel is greater than a first threshold, and a rate of the first packet flow is greater than another threshold, it indicates that a rate on the first channel has been saturated. If a packet flow is further allocated to the first channel, the first channel is inevitably overloaded. In this case, another channel identifier needs to be allocated to the first packet flow. Usually, the first ingress node selects a channel whose packet transmission rate is lower than a second threshold as the another channel. However, if a rate of the another channel also does not meet a rate requirement of the first packet flow, an idle channel needs to be allocated to the first packet flow as the another channel.

Once the first ingress node allocates the another channel identifier to the first packet flow, the first ingress node allocates a sequence number to each of a plurality of newly received packets included in the first packet flow, and each sequence number is used to indicate a sequence in which a corresponding packet enters the another channel. A minimum sequence number corresponding to the plurality of newly received packets in the first packet flow is 0. When sending the plurality of newly received packets in the first packet flow to the first chip, the first ingress node adds indication information to each of the plurality of newly received packets in the first packet flow. The indication information is used to indicate that the minimum sequence number corresponding to the plurality of newly received packets in the first packet flow is 0.

In a possible implementation, if the first ingress node does not receive, within first duration, traffic that needs to be sent to the first chip through the first channel, the first ingress node sets a state of the first channel to idle, and sets information stored in a memory corresponding to the first channel identifier to zero. Alternatively, if the first ingress node does not receive, within second duration, traffic that needs to be sent to the first chip through the plurality of channels between the first ingress node and the first chip, the first ingress node sets states of the plurality of channels to idle, and sets information stored in the memory corresponding to the identifier of the first chip to zero.

In a possible implementation, to help the first egress node re-sequence received packets, a sequence of the packets is ensured, and the first ingress node may further add an identifier of the second chip to each packet in the updated first packet flow.

According to a second aspect, this application provides a packet re-sequencing method performed on a network. A first egress node receives a plurality of packets included in an updated first packet flow. Each packet includes an identifier of a second chip, a first channel identifier, and a sequence number, and each sequence number is used to indicate a sequence number of a corresponding packet entering a first channel. The first channel identifier is used to indicate the first channel, the second chip is a chip that is on a first ingress node and that is configured to receive a first packet flow, and the updated first packet flow is obtained based on the first packet flow. The plurality of packets included in the updated first packet flow are in a one-to-one correspondence with a plurality of packets included in the first packet flow, each packet in the updated first packet flow further includes a corresponding packet in the first packet flow, and the first channel is one of a plurality of channels between the second chip and the first egress node. The first egress node determines a memory resource of a packet flow based on a source chip of the packet flow and a channel identifier allocated to the packet flow, in other words, a same source chip may be corresponding to a plurality of storage resources, and these storage resources are corresponding to the channel identifier. For example, a source chip of the first packet flow is the second chip, and a channel identifier of the first packet flow is the first channel identifier. Therefore, the first egress node determines, for the first packet flow, a first storage resource corresponding to the identifier of the second chip and the first channel identifier. If the first egress node determines, based on the identifier of the second chip and the first channel identifier, that the first egress node has not allocated a storage resource to the first channel, the first egress node allocates one storage resource as the first storage resource. The first egress node stores the plurality of packets in the first packet flow to the first storage resource based on the sequence number carried in each packet in the updated first packet flow. A location of a packet with a small sequence number in the first storage resource precedes a location of a packet with a large sequence number in the first storage resource. The first channel identifier and the sequence number are used to determine a storage location of a packet. However, packets stored by the first egress node in the first storage resource are packets that are in the updated first packet flow and that are corresponding to the first packet flow, and do not include a chip identifier, a channel identifier, a sequence number, or the like. The first egress node sequentially sends the packets one by one to a destination host of the first packet flow based on storage locations of the packets in the first storage resource. When the first egress node determines that a sequence number carried in an updated first packet is the same as a sequence number of a first storage unit of the first storage resource, in this case, it indicates that a received packet is a first packet in the packet flow. Therefore, the first egress node sends a first packet when the plurality of packets included in the first packet flow are not all stored in the first storage resource. The first packet is one of the plurality of packets included in the first packet flow, the first packet is a packet that first enters the first channel, and the updated first packet is one of the plurality of packets included in the updated first packet flow.

In this application, the first egress node re-sequences the received packet based on a channel identifier and a sequence number of the packet, to resolve a problem of data packet disorder, and improve service performance.

In a possible implementation, the first egress node receives an updated second packet flow. A source chip of the updated second packet flow is a third chip, and the updated second packet flow and the updated first packet flow come from different chips. The first egress node also determines the first storage resource based on an identifier of the third chip and the first channel identifier. However, locations of the plurality of packets that are in the second packet flow and that are in the first storage resource are different from locations of the plurality of packets that are in the first packet flow and that are in the first storage resource.

In a possible implementation, the first egress node receives an updated third packet flow. A source chip of the updated third packet flow is the second chip. The updated third packet flow and the foregoing updated first packet flow come from a same chip, but have different destination chips. The first egress node determines a second storage resource based on the identifier of the second chip and a second channel identifier.

In a possible implementation, when a quantity of available storage resources corresponding to a chip that is on the first egress node and that is configured to receive the updated first packet flow is less than a third threshold, the first egress node sends a first message. The first message (for example, a broadcast message) is used to notify the second chip or another chip to stop sending a packet to the chip configured to receive the updated first packet flow in a per-packet load sharing manner. Alternatively, after the first egress node notifies the second chip or the another chip to stop sending the packet to the chip configured to receive the updated first packet flow in the per-packet load sharing manner, when the first egress node determines that the quantity of available storage resources corresponding to the chip that is on the first egress node and that is configured to receive the updated first packet flow is greater than a fourth threshold, the first egress node sends a second message. The second message (for example, the broadcast message) is used to notify the second chip or the another chip to send a packet to the chip configured to receive the updated first packet flow in the per-packet load sharing manner.

In a possible implementation, if no packet is stored in the first storage resource within third duration, the first egress node sets a state of the first storage resource to idle, and sets information stored in a memory corresponding to the first storage resource to zero. Alternatively, if no packet is stored in a plurality of storage resources corresponding to the third chip within fourth duration, the first egress node sets states of the plurality of storage resources to idle, and sets information stored in the memory corresponding to the plurality of storage resources to zero.

According to a third aspect, this application provides a route advertisement method on a network. A first egress node generates first routing information, and the first routing information includes an address of a host connected to the first egress node through a first chip and an identifier of the first chip. The first egress node includes the first chip, and the first egress node sends the first routing information to a first ingress node.

In addition, the first egress node may further generate second routing information. The second routing information includes an address of a host connected to the first egress node through a second chip and an identifier of the second chip. The first egress node includes the second chip, and the first egress node sends the second routing information to the first ingress node.

The first routing information and the second routing information may further include information used to indicate that the first chip or the second chip has a re-sequencing capability.

According to a fourth aspect, this application provides a load balancing apparatus performed on a network. The network includes a first ingress node, a first egress node, and at least one intermediate node. The first ingress node is connected to the first egress node through the at least one intermediate node, the apparatus is used on the first ingress node, and the apparatus includes a first packet receiving module, configured to receive a plurality of packets included in a first packet flow, where a destination address of the first packet flow is an address of a host connected to the first egress node through a first chip, and the first egress node includes the first chip, a chip determining module, configured to determine an identifier of the first chip based on the first packet flow and a first entry in a forwarding table, where the first entry includes the destination address of the first packet flow and the identifier of the first chip, a channel allocation module, configured to allocate a first channel identifier to the first packet flow based on the identifier of the first chip, a sequence number allocation module, configured to allocate a sequence number to each of the plurality of packets included in the first packet flow, where each sequence number is used to indicate a sequence in which a corresponding packet enters a first channel, the first channel identifier is used to indicate the first channel, and the first channel is one of a plurality of channels between the first ingress node and the first chip, a packet updating module, configured to generate an updated first packet flow based on the first packet flow, where the updated first packet flow includes a plurality of packets, the plurality of packets included in the updated first packet flow are in a one-to-one correspondence with the plurality of packets included in the first packet flow, and each packet in the updated first packet flow includes a corresponding packet in the first packet flow, a sequence number of the corresponding packet in the first packet flow, and the first channel identifier, and a packet sending module, configured to send the plurality of packets in the updated first packet flow to the first egress node in a per-packet load sharing manner.

In a possible implementation, the packet receiving module is further configured to receive a plurality of packets included in a second packet flow. A destination address of the second packet flow is an address of a host connected to the first egress node through the first chip.

The chip determining module is further configured to determine the identifier of the first chip based on the second packet flow and a second entry in the forwarding table. The second entry includes the destination address of the second packet flow and the identifier of the first chip.

The channel allocation module is further configured to allocate the first channel identifier to the second packet flow based on the identifier of the first chip.

The sequence number allocation module is further configured to allocate a sequence number to each of the plurality of packets included in the second packet flow. Each sequence number is used to indicate a sequence in which a corresponding packet enters the first channel.

The packet updating module is further configured to generate an updated second packet flow based on the second packet flow. The updated second packet flow includes a plurality of packets. The plurality of packets included in the updated second packet flow are in a one-to-one correspondence with the plurality of packets included in the second packet flow. Each packet in the updated second packet flow includes a corresponding packet in the second packet flow, a sequence number of the corresponding packet in the second packet flow, and the first channel identifier.

The packet sending module is further configured to send the plurality of packets in the updated second packet flow to the first egress node in the per-packet load sharing manner.

In a possible implementation, each packet in the updated first packet flow further includes an identifier of a chip that is on the first ingress node and that is configured to receive the first packet flow. The first channel is one of a plurality of channels between the first chip and the chip that is on the first ingress node and that is configured to receive the first packet flow.

In a possible implementation, the channel allocation module is further configured to, when the first ingress node detects that a rate of a packet transmitted on the first channel is greater than a first threshold, allocate another channel identifier to the first packet flow. The another channel identifier is used to indicate another channel, the another channel is one of the plurality of channels between the first ingress node and the first chip, and the another channel is different from the first channel.

In a possible implementation, the channel allocation module is specifically configured to determine, for the first packet flow, an identifier of a channel whose rate is lower than a second threshold as the another channel identifier.

In a possible implementation, the sequence number allocation module is further configured to allocate a sequence number to each of a plurality of newly received packets included in the first packet flow. Each sequence number is used to indicate a sequence in which a corresponding packet enters the another channel, and a minimum sequence number corresponding to the plurality of newly received packets in the first packet flow is 0.

The packet sending module is further configured to, when sending the plurality of newly received packets in the first packet flow to the first chip, add indication information to each of the plurality of newly received packets in the first packet flow. The indication information is used to indicate that the minimum sequence number corresponding to the plurality of newly received packets in the first packet flow is 0.

In a possible implementation, the channel allocation module is further configured to, if the first ingress node does not receive, within first duration, traffic that needs to be sent to the first chip through the first channel, set a state of the first channel to idle, and set information stored in a memory corresponding to the first channel identifier to zero, or if the first ingress node does not receive, within second duration, traffic that needs to be sent to the first chip through the plurality of channels between the first ingress node and the first chip, set states of the plurality of channels to idle, and set information stored in the memory corresponding to the identifier of the first chip to zero.

According to a fifth aspect, this application provides a packet re-sequencing apparatus performed on a network. The network includes a first ingress node, a first egress node, and at least one intermediate node. The first ingress node is connected to the first egress node through the at least one intermediate node, the apparatus is used on the first egress node, and the apparatus includes a packet receiving module, configured to receive a plurality of packets included in an updated first packet flow, where each packet includes an identifier of a second chip, a first channel identifier, and a sequence number, and each sequence number is used to indicate a sequence number of a corresponding packet entering a first channel, where the first channel identifier is used to indicate the first channel, the second chip is a chip that is on the first ingress node and that is configured to receive a first packet flow, the updated first packet flow is obtained based on the first packet flow, the plurality of packets included in the updated first packet flow are in a one-to-one correspondence with a plurality of packets included in the first packet flow, each packet in the updated first packet flow further includes a corresponding packet in the first packet flow, and the first channel is one of a plurality of channels between the second chip and the first egress node, a resource determining module, configured to determine a first storage resource based on the identifier of the second chip and the first channel identifier, a packet storage module, configured to store the plurality of packets in the first packet flow to the first storage resource based on the sequence number carried in each packet in the updated first packet flow, where a location of a packet with a small sequence number in the first storage resource precedes a location of a packet with a large sequence number in the first storage resource, and a packet sending module, configured to send the plurality of packets that are included in the first packet flow and that are stored in the first storage resource, where a packet stored at a front location of the first storage resource is sent before a packet stored at a rear location of the first storage resource.

In a possible implementation, the packet receiving module is further configured to receive a plurality of packets included in an updated second packet flow. Each packet includes an identifier of a third chip, the first channel identifier, and a sequence number, and the third chip is a chip that is on the first ingress node and that is configured to receive a second packet flow. The updated second packet flow is obtained based on the second packet flow, the plurality of packets included in the updated second packet flow are in a one-to-one correspondence with a plurality of packets included in the second packet flow, and each packet in the updated second packet flow further includes a corresponding packet in the second packet flow.

The resource determining module is further configured to determine the first storage resource based on the identifier of the third chip and the first channel identifier.

The packet storage module is further configured to store the plurality of packets in the second packet flow to the first storage resource based on the sequence number carried in each packet in the updated second packet flow. A location of a packet with a small sequence number in the first storage resource precedes a location of a packet with a large sequence number in the first storage resource.

The packet sending module is further configured to send the plurality of packets that are included in the second packet flow and that are stored in the first storage resource. A packet stored at a front location of the first storage resource is sent before a packet stored at a rear location of the first storage resource.

In a possible implementation, the packet sending module is specifically configured to, when determining that a sequence number carried in an updated first packet is the same as a sequence number of a first storage unit of the first storage resource, send a first packet when the plurality of packets included in the first packet flow are not all stored in the first storage resource. The first packet is one of the plurality of packets included in the first packet flow, the first packet is a packet that first enters the first channel, and the updated first packet is one of the plurality of packets included in the updated first packet flow.

In a possible implementation, the apparatus further includes a message sending module, configured to send a first message when a quantity of available storage resources corresponding to a chip that is on the first egress node and that is configured to receive the updated first packet flow is less than a third threshold, where the first message is used to notify the second chip to stop sending a packet to the chip configured to receive the updated first packet flow in a per-packet load sharing manner, or after notifying the second chip to stop sending the packet to the chip configured to receive the updated first packet flow in the per-packet load sharing manner, send a second message when the first egress node determines that the quantity of available storage resources corresponding to the chip that is on the first egress node and that receives the updated first packet flow is greater than a fourth threshold, where the second message is used to notify the second chip to send the packet to the chip configured to receive the updated first packet flow in the per-packet load sharing manner.

In a possible implementation, the resource determining module is further configured to, if no packet is stored in the first storage resource within third duration, set a state of the first storage resource to idle, and set information stored in a memory corresponding to the first storage resource to zero, or if no packet is stored in a plurality of storage resources corresponding to the third chip within fourth duration, set states of the plurality of storage resources to idle, and set information stored in the memory corresponding to the plurality of storage resources to zero.

According to a sixth aspect, this application provides a route advertisement apparatus on a network. The network includes a first ingress node, a first egress node, and at least one intermediate node. The first ingress node is connected to the first egress node through the at least one intermediate node, the apparatus is used on the first egress node, and the apparatus includes a route generation module, configured to generate first routing information, where the first routing information includes an address of a host connected to the first egress node through a first chip and an identifier of the first chip, and the first egress node includes the first chip, and a route sending module, configured to send the first routing information to the first ingress node.

In a possible implementation, the first routing information further includes information used to indicate that the first chip has a re-sequencing capability.

In a possible implementation, the route generation module is further configured to generate second routing information. The second routing information includes an address of a host connected to the first egress node through a second chip and an identifier of the second chip, and the first egress node includes the second chip.

The route sending module is further configured to send the second routing information to the first ingress node.

In a possible implementation, the second routing information further includes information used to indicate that the second chip has the re-sequencing capability.

According to a seventh aspect, this application provides a first ingress node on a network. The network includes the first ingress node, a first egress node, and at least one intermediate node. The first ingress node is connected to the first egress node through the at least one intermediate node. The first ingress node includes one or more processors, and a storage apparatus, configured to store one or more programs.

When the one or more programs are executed by the one or more processors, the one or more processors are enabled to implement the load balancing method performed on a network according to any one of the first aspect.

According to an eighth aspect, this application provides a first egress node on a network. The network includes a first ingress node, the first egress node, and at least one intermediate node. The first ingress node is connected to the first egress node through the at least one intermediate node. The first egress node includes one or more processors, and a storage apparatus, configured to store one or more programs.

When the one or more programs are executed by the one or more processors, the one or more processors are enabled to implement the packet re-sequencing method performed on a network according to any one of the second aspect, or the route advertisement method performed on a network according to any one of the third aspect.

According to a ninth aspect, this application provides a network, including a first ingress node, a first egress node, and at least one intermediate node. The first ingress node is connected to the first egress node through the at least one intermediate node. The first ingress node uses the apparatus according to any one of the fourth aspect or the seventh aspect, and the first egress node uses the apparatus according to any one of the fifth aspect, the sixth aspect, or the eighth aspect.

According to a tenth aspect, this application provides a computer-readable storage medium. The computer-readable storage medium stores a computer program. The computer program includes at least one portion of code. The at least one portion of code may be executed by a computer, to control the computer to perform the method according to any one of the first aspect to the third aspect.

According to an eleventh aspect, this application provides a computer program. When being executed by a computer, the computer program is used to perform the method according to any one of the first aspect to the third aspect.

BRIEF DESCRIPTION OF DRAWINGS

To describe the technical solutions in this application or in other approaches more clearly, the following describes the accompanying drawings for describing the embodiments. The accompanying drawings in the following description show some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following clearly describes the technical solutions in this application with reference to the accompanying drawings in this application. The described embodiments are some but not all of the embodiments of this application.

Figure 1:
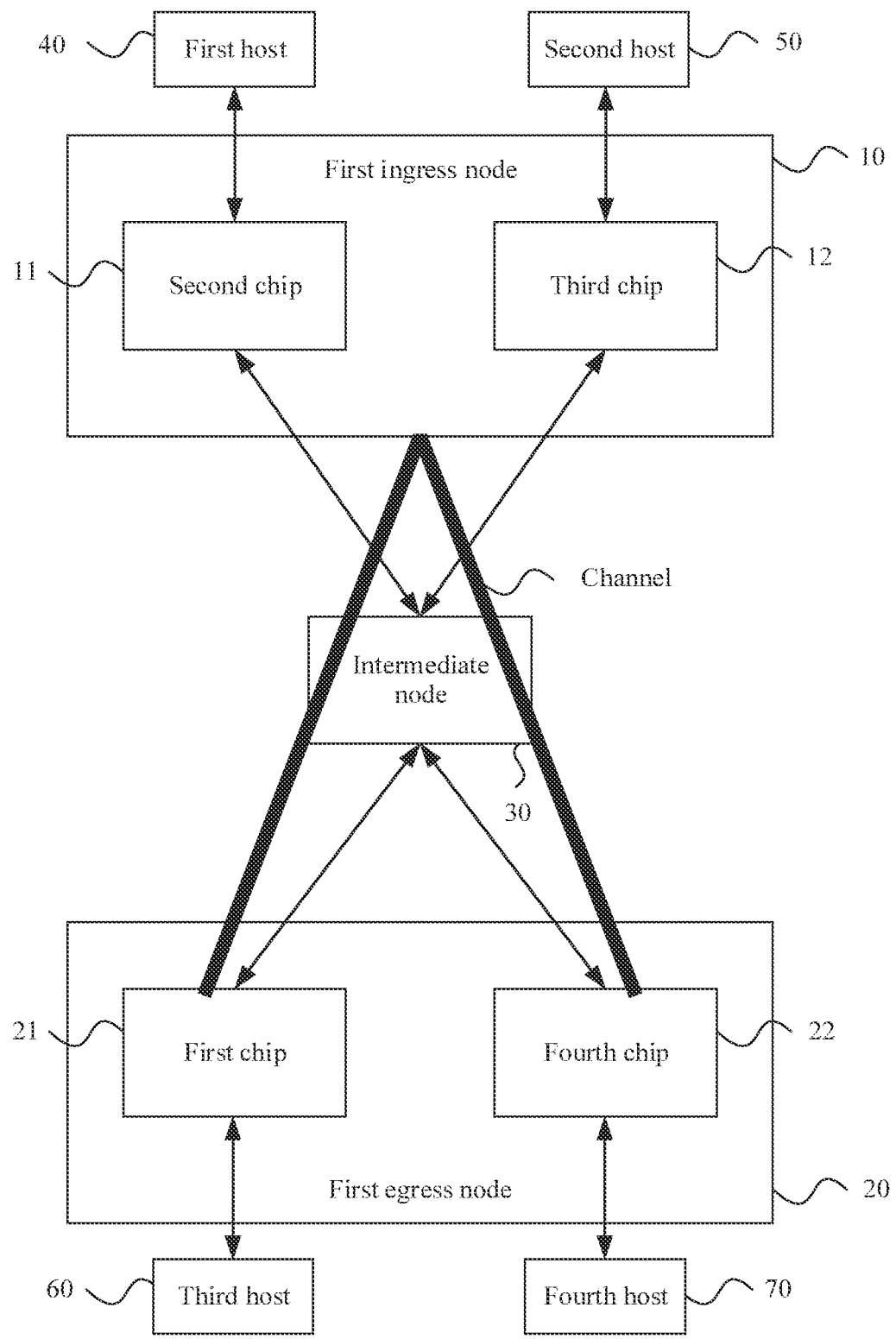
FIG. 1 is a schematic structural diagram of an embodiment of a network according to this application.

FIG. 1 is a schematic structural diagram of an embodiment of a network according to this application. As shown in FIG. 1, the network includes a first ingress node 10, a first egress node 20, and at least one intermediate node 30. The first ingress node 10 is connected to the first egress node 20 through the at least one intermediate node 30. In this application, the ingress node and/or the egress node may include one or more chips. The node is connected to a host through the chip. For example, the first ingress node 10 includes a second chip 11 and a third chip 12. The first ingress node 10 is connected to a first host 40 through the second chip 11, and is connected to a second host 50 through the third chip 12. The first egress node 20 includes a first chip 21 and a fourth chip 22. The first egress node 20 is connected to a third host 60 through the first chip 21, and is connected to a fourth host 70 through the fourth chip 22. A packet flow is sent from a host at one end of the network to another host at the other end. Therefore, the packet flow is received by a chip connected to a source host after being sent from the source host. The chip is a chip that sends the packet flow to the egress node through the intermediate node. The chip is a chip connected to a destination host. Further, the egress node may send the packet flow to the destination host through the chip connected to the destination host. In this application, a plurality of virtual channels are created for packet flows that come from the first ingress node and that are sent to a same destination chip based on a network topology structure. For example, there are a plurality of channels between the first ingress node and the first chip. There are a plurality of channels between the first ingress node and the fourth chip. The first ingress node performs load balancing based on the packet flow, and different packet flows that arrive at a same chip may enter a same channel or different channels related to the chip. A same packet flow may also enter a same channel or different channels related to the destination chip. In addition, a sequence number is allocated to each packet entering the channel, to indicate a sequence in which the packet enters the channel. The first egress node is responsible for performing packet re-sequencing. Specifically, a plurality of packets in a packet flow that arrive at the destination chip in a random sequence are re-sequenced based on a channel in which the packet flow is located and a sequence number of each packet. In this way, the packets in the packet flow are sent to the destination host in a correct sequence.

It should be noted that, the first ingress node 10, the first egress node 20, and the intermediate node 30 in the embodiment all represent a type of network node on the network. There may be one or more network nodes in one or more of the first ingress node 10, the first egress node 20, and the intermediate node 30. The network node itself may be used as a sending node of a packet flow, and may also be used as a receiving node of a packet flow. In the embodiment, the ingress node and the egress node are distinguished for ease of describing a flow direction of the packet flow, but functions of the nodes are not limited. In addition, the network shown in FIG. 1 includes an edge network and a forwarding network. Hosts are located on the edge network. Specifically, the first host 40 and the second host 50 are located on an edge network. The third host 60 and the fourth host 70 are located on another edge network. The ingress node, the intermediate node, and the egress node are located on the forwarding network. When two hosts (for example, the first host 40 and the third host 60) that are separately located on different edge networks communicate with each other, traffic sent by one host (for example, the first host 40) needs to enter the forwarding network through the ingress node (for example, the first ingress node 10). Then, the traffic needs to leave the forwarding network through the egress node (for example, the first egress node 20). In addition, the third host 60 connected to the first chip 11 also represents a type of host, and there may be one or more hosts. The third host 60 may be a device that sends data, or may be a device that receives data. This is related to the flow direction of the packet flow, and is not specifically limited. The first host 40, the second host 50, and the fourth host 70 are all similar to this. This embodiment exemplarily provides a scenario in which each of the first ingress node 10 and the first egress node 20 includes two chips, but is not limited to this network structure. There may be more possible quantities of chips included in the first ingress node 10 and/or the first egress node 20, and this is not specifically limited.

Figure 2:
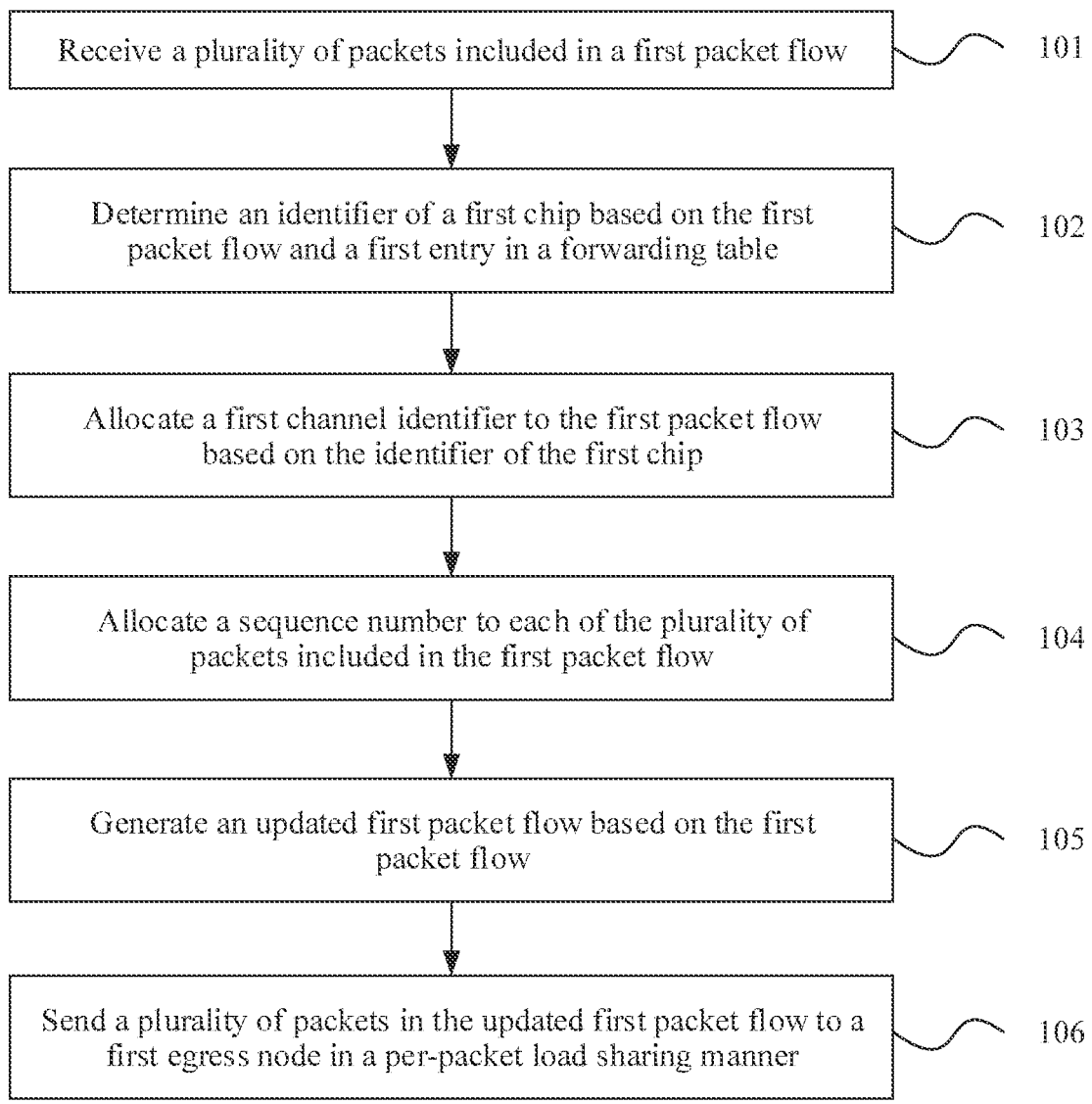
FIG. 2 is a flowchart of Embodiment 1 of a load balancing method performed on a network according to this application.

FIG. 2 is a flowchart of Embodiment 1 of a load balancing method performed on a network according to this application. As shown in FIG. 2, the method in this embodiment is applied to the network shown in FIG. 1, and is performed by a first ingress node. The method may include steps 101 to 106.

Step 101: Receive a plurality of packets included in a first packet flow.

A destination address of the first packet flow is an address of a host connected to a first egress node through a first chip.

The first ingress node receives, through a second chip, the plurality of packets included in the first packet flow from a first host connected to the second chip. A destination address of the first packet flow is an address of a third host connected to the first egress node through the first chip.

Step 102: Determine an identifier of a first chip based on the first packet flow and a first entry in a forwarding table.

The first entry includes the destination address of the first packet flow and the identifier of the first chip.

The first ingress node determines the identifier of the first chip based on the first packet flow and the first entry in the forwarding table. The first entry includes the destination address of the first packet flow and the identifier of the first chip. As described above, the first egress node is connected to the host through the chip, and one chip may be connected to a plurality of hosts. The forwarding table is configured on the first ingress node based on an egress node that the first ingress node can reach and a chip on the egress node. An entry in the forwarding table represents a correspondence between a destination address of a packet flow and a chip on an egress node. For example, the first entry includes the address of the third host and the identifier of the first chip, indicating a correspondence between the address of the third host and the first chip. The address of the third host may be an Internet Protocol (IP) address of the third host or a media access control (MAC) address of the third host.

Step 103: Allocate a first channel identifier to the first packet flow based on the identifier of the first chip.

The first channel identifier is used to indicate a first channel, and the first channel is one of a plurality of channels between the first ingress node and the first chip.

After determining the identifier of the first chip corresponding to an egress, the first ingress node allocates the first channel identifier to the first packet flow based on the identifier of the first chip. The first channel identifier is used to indicate the first channel, and the first channel is one of the plurality of channels between the first ingress node and the first chip. In this application, the first ingress node allocates a channel to a packet flow based on a destination chip of the packet flow. For example, if the destination chip of the first packet flow is the first chip, a channel allocated to the first packet flow is one of a plurality of channels related to the first chip. In this application, the first ingress node may allocate, to the first packet flow, an identifier of a default channel corresponding to the identifier of the first chip as the first channel identifier. One default channel is set in the plurality of channels between the first ingress node and the first chip. A priority of the channel is higher than that of another channel, to be specific, a packet in the default channel is sent before a packet in the another channel.

Figure 3:
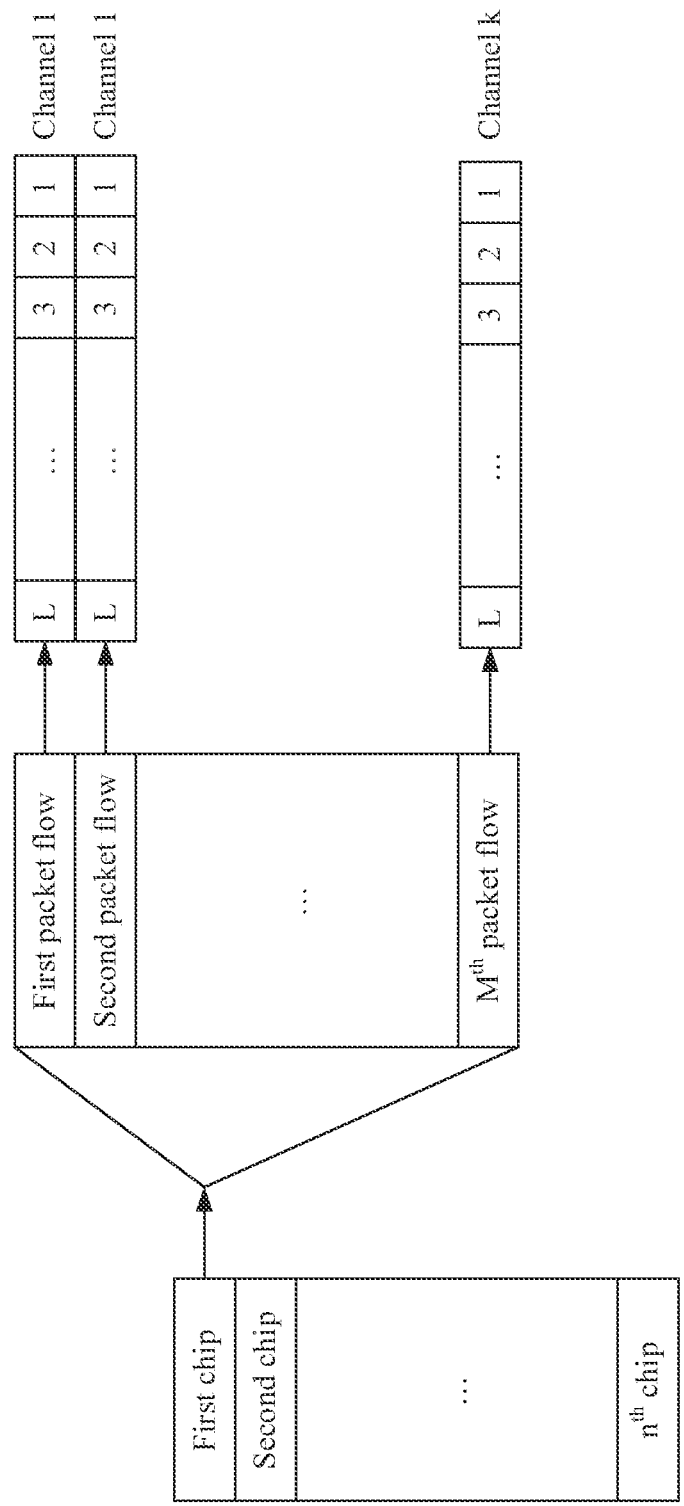
FIG. 3 is a schematic diagram of a correspondence in Embodiment 1 of a load balancing method performed on a network according to this application.

In this application, the first ingress node records information about a correspondence between a destination chip and a channel identifier. FIG. 3 is a schematic diagram of a correspondence in Embodiment 1 of a load balancing method performed on a network according to this application. As shown in FIG. 3, based on a network topology, packet flows entering the first ingress node may be sent to different destination addresses. Each destination address is connected to a destination chip located on the first egress node, and the first ingress node may create one or more virtual channels for each destination chip. The channel is identified by a channel identifier, and the channel corresponding to each destination chip is dynamically allocated. Whether to create the channel or continue to add a new channel for the destination chip, or reduce an existing channel of the destination chip may be determined based on traffic of a packet flow sent to the destination chip. For example, when the first ingress node determines that the destination chip to which the first packet flow is sent is the first chip, the first ingress node usually allocates, to the first packet flow based on the information about the correspondence, a default channel identifier in the plurality of channels corresponding to the first chip. However, if a rate of a packet transmitted on the default channel is greater than a first threshold, the first ingress node allocates another non-default channel identifier to the first packet flow. In addition, a sequence number is further allocated to each packet in the first packet flow, and the sequence number is used to indicate a sequence in which a corresponding packet enters a channel. This ensures a sequence of packets in the packet flow.

Step 104: Allocate a sequence number to each of the plurality of packets included in the first packet flow.

Each sequence number is used to indicate a sequence in which a corresponding packet enters the first channel.

The first ingress node allocates the sequence number to each of the plurality of packets included in the first packet flow. Each sequence number is used to indicate the sequence in which the corresponding packet enters the first channel.

Step 105: Generate an updated first packet flow based on the first packet flow.

The updated first packet flow includes a plurality of packets, and the plurality of packets included in the updated first packet flow are in a one-to-one correspondence with the plurality of packets included in the first packet flow. Each packet in the updated first packet flow includes a corresponding packet in the first packet flow, a sequence number of the corresponding packet in the first packet flow, and the first channel identifier.

The first ingress node generates the updated first packet flow based on the first packet flow. Before sending a packet in the first packet flow, the first ingress node further adds, to the packet, a channel identifier (the first channel identifier) and a sequence number that are allocated to the packet in the foregoing step in addition to the packet itself and that are used on the first egress node to implement packet re-sequencing.

TABLE 1

| ETH packet header | IP packet header | Source chip identifier | Indication information | Channel identifier | Sequence number | TCP/UDP packet header |
| --- | --- | --- | --- | --- | --- | --- |

Table 1 is an example of a format of a packet sent by the first ingress node to the first egress node. In addition to the Ethernet (ETH) packet header, the IP packet header, and the Transmission Control Packet (TCP)/User Datagram Protocol (UDP) packet header, information related to this application includes the source chip identifier, the channel identifier and the sequence number, wherein the source chip identifier is used to indicate a chip (for example, the second chip) that is on the first ingress node and that receives the packet, the channel identifier is used to indicate an identifier (for example, the first channel identifier) of a channel that is allocated by the first ingress node to a packet flow in which the packet is located, and the sequence number is used to indicate a sequence in which the packet enters the channel.

Step 106: Send a plurality of packets in the updated first packet flow to a first egress node in a per-packet load sharing manner.

Finally, the first ingress node sends the plurality of packets in the updated first packet flow to the first egress node in the per-packet load sharing manner, and the first channel identifier and a sequence number are allocated to each packet in the updated first packet flow. When sending these packets, the first ingress node sequentially sends the packets from each egress port one by one based on a sequence of a channel and a sequence of the sequence number, and this is implemented in the per-packet load sharing manner.

In this application, the first ingress node allocates, by flow, a channel to a to-be-sent packet flow, allocates, by packet, sequence numbers to packets in the packet flow, and sends the packets one by one from each egress port based on a sequence of the channel and a sequence of the sequence number. This realizes load balancing between network links, and improves bandwidth utilization.

In a possible implementation, the entry of the forwarding table may further include an identifier used to indicate whether a chip on the first egress node supports the packet re-sequencing, and the first ingress node determines, based on the identifier, how to send a packet flow to the first egress node. For example, if the first chip does not support the packet re-sequencing, the first ingress node cannot perform load balancing on the first packet flow by using the foregoing method, and can only send the first packet flow to the first egress node in a per-flow distribution manner.

Figure 4:
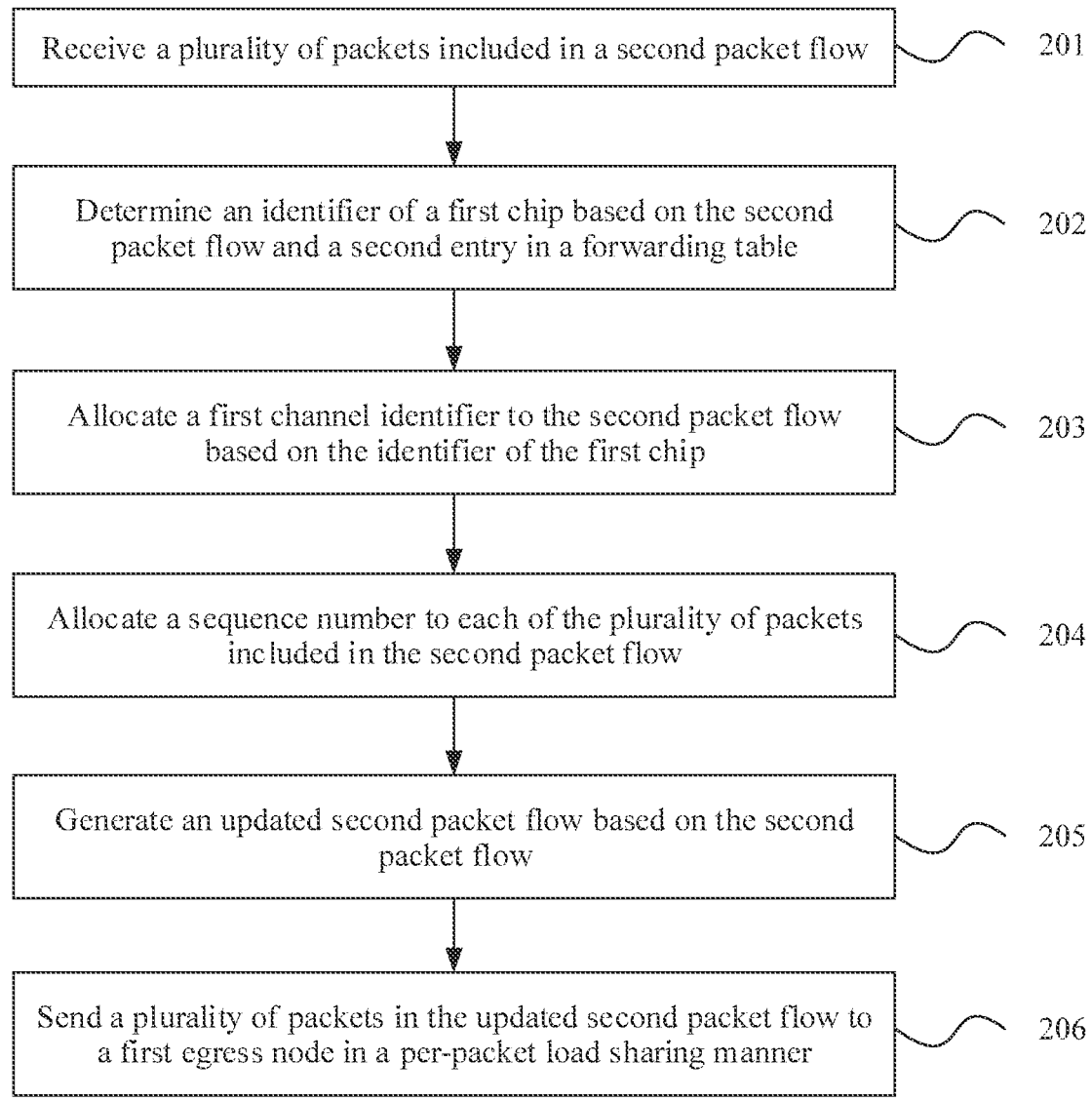
FIG. 4 is a flowchart of Embodiment 2 of a load balancing method performed on a network according to this application.

FIG. 4 is a flowchart of Embodiment 2 of a load balancing method performed on a network according to this application. The method shown in FIG. 4 is obtained through extension of the method shown in FIG. 2. As shown in FIG. 4, the method in this embodiment is applied to the network shown in FIG. 1, and is performed by a first ingress node. The method shown in FIG. 4 may include steps 201 to 206.

Step 201: Receive a plurality of packets included in a second packet flow.

A destination address of the second packet flow is an address of a host connected to a first egress node through a first chip.

The second packet flow in this embodiment and the first packet flow in the method embodiment shown in FIG. 2 have different features. For example, the second packet flow comes from a second host connected to a third chip on the first ingress node, and is received by the third chip. Alternatively, a 2-tuple or a 5-tuple of the second packet flow is different from that of the first packet. In particular, a source address of the second packet flow is different from a source address of the first packet flow, and a destination address of the second packet flow may be different from or the same as a destination address of the first packet flow. However, the second packet and the first packet are the same, to be specific, both a host to which the second packet flow is sent and a host to which the first packet flow is sent are connected to the first chip on the first egress node.

Step 202: Determine an identifier of a first chip based on the second packet flow and a second entry in a forwarding table.

The second entry includes the destination address of the second packet flow and the identifier of the first chip.

The first ingress node determines the identifier of the first chip based on the second packet flow and the second entry in the forwarding table. As described above, the destination address of the second packet flow is the address of the host connected to the first chip. Therefore, the second entry includes the destination address of the second packet flow and the identifier of the first chip, indicating a correspondence between the destination address of the second packet flow and the first chip.

Step 203: Allocate a first channel identifier to the second packet flow based on the identifier of the first chip.

Same as step 103 in the foregoing method embodiment, after the identifier of the first chip corresponding to an egress is determined, the first ingress node also allocates the first channel identifier to the second packet flow.

Step 204: Allocate a sequence number to each of the plurality of packets included in the second packet flow.

Each sequence number is used to indicate a sequence in which a corresponding packet enters the first channel.

A principle of this step is similar to that of step 104 in the foregoing method embodiment, and details are not described herein again.

Step 205: Generate an updated second packet flow based on the second packet flow.

The updated second packet flow includes a plurality of packets, and the plurality of packets included in the updated second packet flow are in a one-to-one correspondence with the plurality of packets included in the second packet flow. Each packet in the updated second packet flow includes a corresponding packet in the second packet flow, a sequence number of the corresponding packet in the second packet flow, and the first channel identifier.

The first ingress node generates the updated second packet flow based on the second packet flow. Before sending a packet in the second packet flow, the first ingress node further adds, to the packet, a channel identifier (the first channel identifier) and a sequence number that are allocated to the packet in the foregoing step in addition to the packet itself and that are used on the first egress node to implement packet re-sequencing.

Step 206: Send a plurality of packets in the updated second packet flow to a first egress node in a per-packet load sharing manner.

A principle of this step is similar to that of step 106 in the foregoing method embodiment, and details are not described herein again.

In this embodiment, because both the host to which the second packet flow is sent and the host to which the first packet flow is sent are connected to the first chip on the first egress node, in this case, the first ingress node allocates the first channel identifier to the two packet flows. This indicates that both the first packet flow and the second packet flow are allocated to the first channel. However, when a sequence number is allocated to a packet, the sequence number is allocated to the packet based on a sequence in which the packet enters the first channel.

Figure 5:
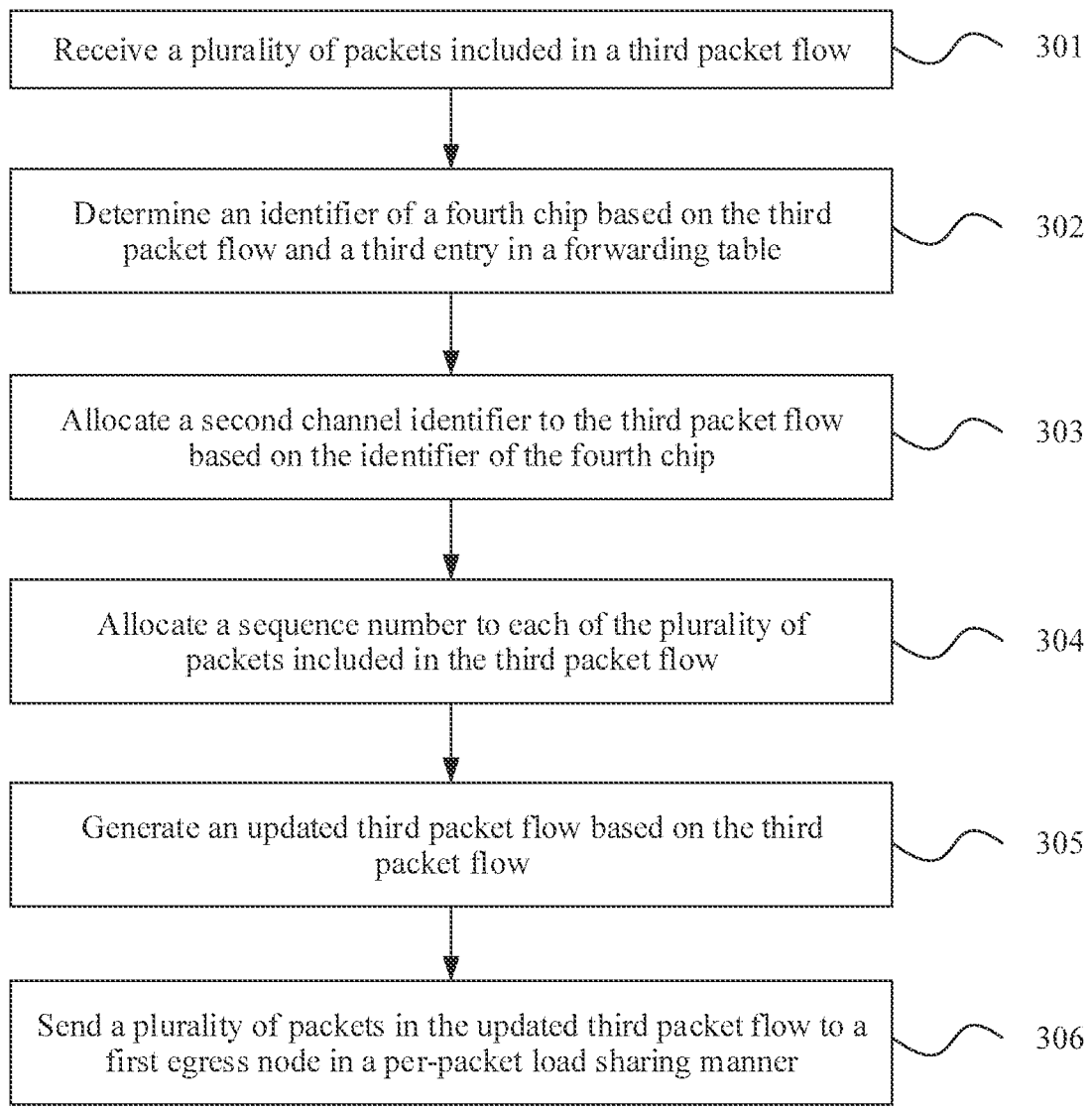
FIG. 5 is a flowchart of Embodiment 3 of a load balancing method performed on a network according to this application.

FIG. 5 is a flowchart of Embodiment 3 of a load balancing method performed on a network according to this application. The method shown in FIG. 5 is obtained through extension of the method shown in FIG. 2 and the method shown in FIG. 4. As shown in FIG. 5, the method in this embodiment is applied to the network shown in FIG. 1, and is performed by a first ingress node. The method shown in FIG. 5 may include steps 301 to 306.

Step 301: Receive a plurality of packets included in a third packet flow.

A destination address of the third packet flow is an address of a host connected to a first egress node through a fourth chip.

The third packet flow in this embodiment and the first packet flow in the method embodiment shown in FIG. 2 have different features. For example, a host to which the third packet flow is sent and a host to which the first packet flow is sent are connected to different chips on the first egress node. A destination chip of the third packet flow is the fourth chip, and a destination chip of the first packet flow is a first chip.

Step 302: Determine an identifier of a fourth chip based on the third packet flow and a third entry in a forwarding table.

The third entry includes the destination address of the third packet flow and the identifier of the fourth chip.

The first ingress node determines the identifier of the fourth chip based on the third packet flow and the third entry in the forwarding table. As described above, the destination address of the third packet flow is the address of the host connected to the fourth chip. Therefore, the third entry includes the destination address of the third packet flow and the identifier of the fourth chip, indicating a correspondence between the destination address of the third packet flow and the fourth chip.

Step 303: Allocate a second channel identifier to the third packet flow based on the identifier of the fourth chip.

The second channel identifier is used to indicate a second channel, and the second channel is one of a plurality of channels between the first ingress node and the fourth chip.

After determining the identifier of the fourth chip corresponding to an egress, the first ingress node allocates the second channel identifier to the third packet flow based on the identifier of the fourth chip. The second channel identifier is used to indicate the second channel, and the second channel is one of the plurality of channels between the first ingress node and the fourth chip. In this application, the first ingress node allocates a channel to a packet flow based on a destination chip of the packet flow. For example, if the destination chip of the third packet flow is the fourth chip, a channel allocated to the third packet flow is one of a plurality of channels related to the fourth chip.

Step 304: Allocate a sequence number to each of the plurality of packets included in the third packet flow.

Each sequence number is used to indicate a sequence in which a corresponding packet enters the second channel.

A principle of this step is similar to that of step 104 in the foregoing method embodiment, and details are not described herein again.

Step 305: Generate an updated third packet flow based on the third packet flow.

The updated third packet flow includes a plurality of packets, and the plurality of packets included in the updated third packet flow are in a one-to-one correspondence with the plurality of packets included in the third packet flow. Each packet in the updated third packet flow includes a corresponding packet in the third packet flow, a sequence number of the corresponding packet in the third packet flow, and the second channel identifier.

The first ingress node generates the updated third packet flow based on the third packet flow. Before sending a packet in the third packet flow, the first ingress node further adds, to the packet, a channel identifier (the second channel identifier) and a sequence number that are allocated to the packet in the foregoing step in addition to the packet itself and that are used on the first egress node to implement packet re-sequencing.

Step 306: Send a plurality of packets in the updated third packet flow to a first egress node in a per-packet load sharing manner.

A principle of this step is similar to that of step 106 in the foregoing method embodiment, and details are not described herein again.

In this embodiment, because the host to which the third packet flow is sent and the host to which the first packet flow is sent are separately connected to the fourth chip and the first chip on the first egress node, in this case, the first ingress node allocates different channel identifiers to the two packet flows.

According to the foregoing technical solutions, when the first ingress node detects that a rate of a packet transmitted on the first channel is greater than the first threshold, the first ingress node allocates another channel identifier to the first packet flow. The another channel identifier is used to indicate another channel, and the another channel is a channel different from the first channel in the plurality of channels between the first ingress node and the first chip. If selection fails, the first ingress node determines an identifier of an idle channel for the first packet flow as the another channel identifier.

When allocating the channel identifier to the first packet flow sent to the first chip, if the first ingress node detects that the rate of the packet transmitted on the first channel is greater than the first threshold, and a rate of the first packet flow is greater than another threshold, it indicates that a rate on the first channel has been saturated. If a packet flow is further allocated to the first channel, the first channel is inevitably overloaded. In this case, the another channel identifier needs to be allocated to the first packet flow. Usually, the first ingress node selects a channel whose packet transmission rate is lower than a second threshold as the another channel. However, if a rate of the another channel also does not meet a rate requirement of the first packet flow, the idle channel needs to be allocated to the first packet flow as the another channel.

Once the first ingress node allocates the another channel identifier to the first packet flow, the first ingress node allocates a sequence number to each of a plurality of newly received packets included in the first packet flow, and each sequence number is used to indicate a sequence in which a corresponding packet enters the another channel. A minimum sequence number corresponding to the plurality of newly received packets in the first packet flow is 0. When sending the plurality of newly received packets in the first packet flow to the first chip, the first ingress node adds indication information to each of the plurality of newly received packets in the first packet flow. The indication information is used to indicate that the minimum sequence number corresponding to the plurality of newly received packets in the first packet flow is 0.

If the minimum sequence number corresponding to the plurality of newly received packets in the first packet flow is 0, it indicates that the another channel is a newly created channel, and the first egress node will be notified to use the another channel for the packet re-sequencing.

According to the foregoing technical solutions, if the first ingress node does not receive, within first duration, traffic that needs to be sent to the first chip through the first channel, the first ingress node sets a state of the first channel to idle, and sets information stored in a memory corresponding to the first channel identifier to zero. Alternatively, if the first ingress node does not receive, within second duration, traffic that needs to be sent to the first chip through the plurality of channels between the first ingress node and the first chip, the first ingress node sets states of the plurality of channels to idle, and sets information stored in the memory corresponding to the identifier of the first chip to zero.

The memory is a component of the first ingress node, and information stored in the memory includes related information of an allocated channel, for example, a channel identifier and a packet transmission rate of the channel. If there is no traffic to be transmitted on the first channel within the first duration, to improve resource utilization, the state of the first channel may be set to idle, and the related information of the channel is cleared such that this part of resources are used by another chip. If there is no traffic to be transmitted in the plurality of channels between the first ingress node and the first chip in the second duration, similarly, to improve the resource utilization, the states of the plurality of channels may be all set to idle, and related information of the plurality of channels may be cleared such that this part of resources are used by another chip.

To help the first egress node re-sequence received packets, a sequence of the packets is ensured, and the first ingress node may further add an identifier of the second chip to each packet in the updated first packet flow.

Figure 6:
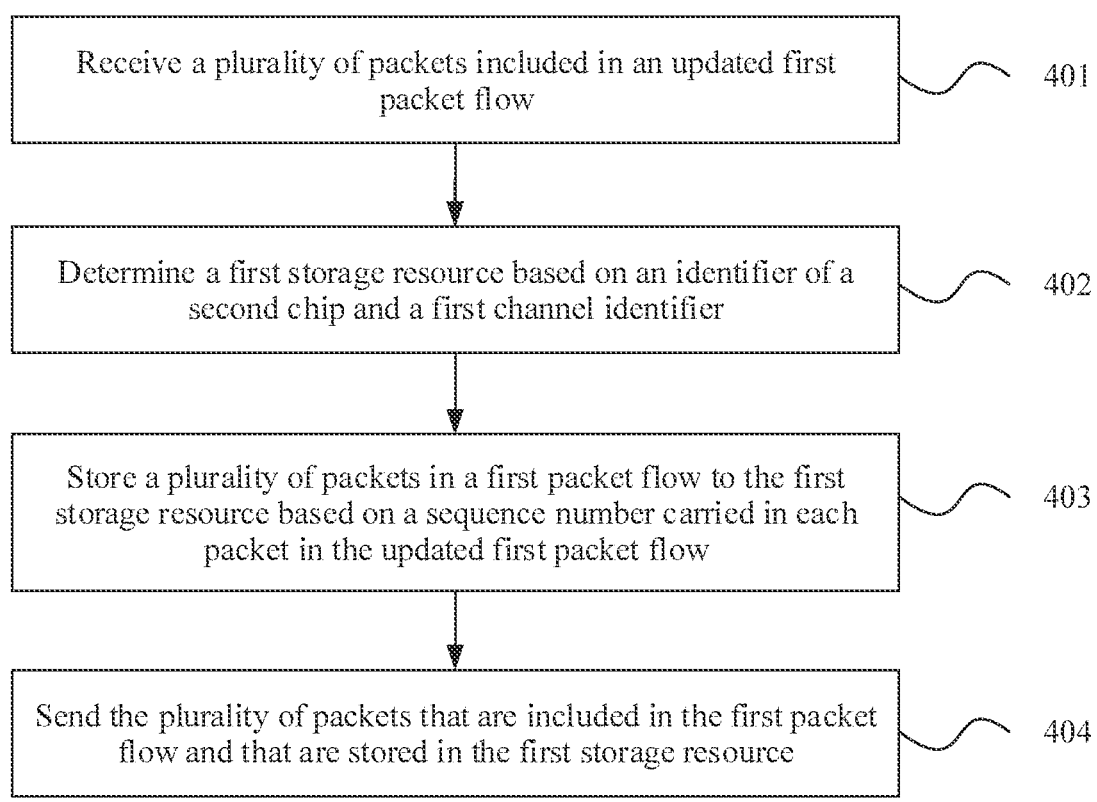
FIG. 6 is a flowchart of Embodiment 1 of a packet re-sequencing method performed on a network according to this application.

FIG. 6 is a flowchart of Embodiment 1 of a packet re-sequencing method performed on a network according to this application. The method shown in FIG. 2 and the method shown in FIG. 6 may be applied to the network shown in FIG. 1, to implement communication between hosts located on different edge networks. Specifically, a first ingress node 10 may obtain, by performing the method shown in FIG. 2, a plurality of packets included in a first packet flow from a first host 40, and send an updated first packet flow to a first egress node 20. The first egress node 20 may receive, by performing the method shown in FIG. 6, the updated first packet flow provided by the first ingress node 10, obtain, based on the updated first packet flow, the plurality of packets included in the first packet flow, and send the plurality of packets included in the first packet flow to a third host 60. As shown in FIG. 6, the method in this embodiment is applied to the network shown in FIG. 1, and is performed by the first egress node. The method shown in FIG. 6 may include steps 401 to 404.

Step 401: Receive a plurality of packets included in an updated first packet flow.

Each packet includes an identifier of a second chip, a first channel identifier, and a sequence number, and each sequence number is used to indicate a sequence number of a corresponding packet entering a first channel. The first channel identifier is used to indicate the first channel, and the second chip is a chip that is on the first ingress node and that is configured to receive the first packet flow. The updated first packet flow is obtained based on the first packet flow, and the plurality of packets included in the updated first packet flow are in a one-to-one correspondence with the plurality of packets included in the first packet flow. Each packet in the updated first packet flow further includes a corresponding packet in the first packet flow, and the first channel is one of a plurality of channels between the second chip and the first egress node.

The first egress node determines a corresponding storage resource based on a chip that sends the updated first packet flow. The second chip is not only the chip that receives the first packet flow, but also the chip that sends the updated first packet flow.

Step 402: Determine a first storage resource based on an identifier of a second chip and a first channel identifier.

The first egress node determines a memory resource of a packet flow based on a source chip of the packet flow and a channel identifier allocated to the packet flow, in other words, a same source chip may be corresponding to a plurality of storage resources, and these storage resources are corresponding to the channel identifier. For example, a source chip of the first packet flow is the second chip, and a channel identifier of the first packet flow is the first channel identifier. Therefore, the first egress node determines, for the first packet flow, the first storage resource corresponding to the identifier of the second chip and the first channel identifier. If the first egress node determines, based on the identifier of the second chip and the first channel identifier, that the first egress node has not allocated a storage resource to the first channel, the first egress node allocates a storage resource as the first storage resource.

Figure 7:
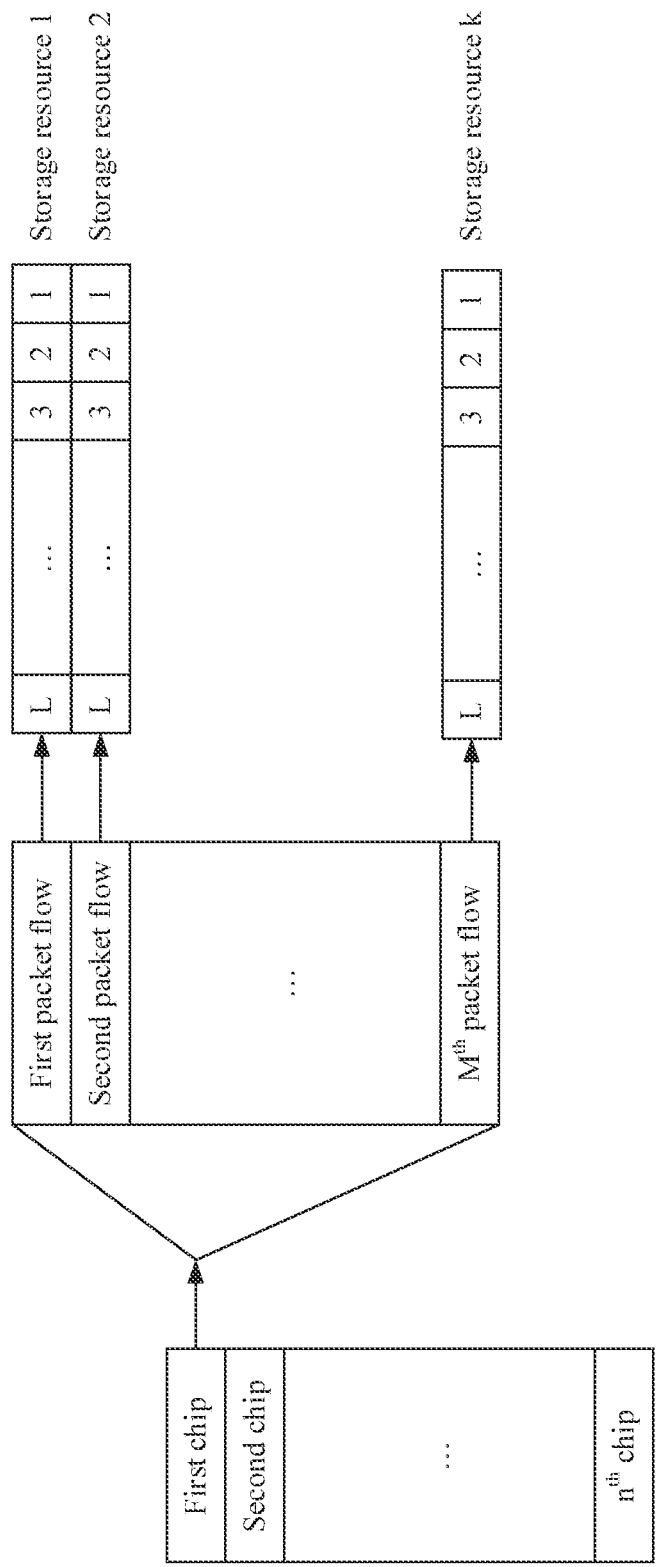
FIG. 7 is a schematic diagram of a correspondence in Embodiment 1 of a packet re-sequencing method performed on a network according to this application.

In this application, the first egress node records information about a correspondence between a source chip and a storage resource. FIG. 7 is a schematic diagram of a correspondence in Embodiment 1 of a packet re-sequencing method performed on a network according to this application. As shown in FIG. 7, based on a network topology, packet flows received by a first egress node come from different source addresses, and each source address is connected to a source chip located on a first ingress node. The first egress node may determine one or more storage resources for each source chip, and the storage resource corresponding to each source chip is dynamically allocated. Whether to determine the storage resource or add a new storage resource for the source chip, or reduce an existing storage resource of the source chip may be determined based on a state of storage of packets on the storage resource. For example, when the first egress node determines that a first packet flow comes from a second chip, the first egress node determines, for the first packet flow based on the information about the correspondence, a first storage resource corresponding to the second chip. A location of a packet in the first storage resource is further determined based on a sequence number carried in the packet in the first packet flow. A location with a small sequence number precedes a location with a large sequence number, and this ensures a sequence of packets in the packet flow.

Step 403: Store the plurality of packets in the updated first packet flow to the first storage resource based on a sequence number carried in each packet in the updated first packet flow.

A location of a packet that is with a small sequence number and that is in the first storage resource precedes a location of a packet that is with a large sequence number and that is in the first storage resource.

The first channel identifier and the sequence number are used to determine a storage location of a packet. However, packets stored by the first egress node in the first storage resource are packets that are in the updated first packet flow and that are corresponding to the first packet flow, and do not include a chip identifier, a channel identifier, a sequence number, or the like.

Step 404: Send the plurality of packets that are included in the first packet flow and that are stored in the first storage resource.

A packet stored at a front location of the first storage resource is sent before a packet stored at a rear location of the first storage resource.

The first egress node sequentially sends the packets one by one to a destination host of the first packet flow based on storage locations of the packets in the first storage resource. When the first egress node determines that a sequence number carried in an updated first packet is the same as a sequence number of a first storage unit of the first storage resource, in this case, it indicates that a received packet is a first packet in the packet flow. Therefore, the first egress node sends a first packet when the plurality of packets included in the first packet flow are not all stored in the first storage resource. The first packet is one of the plurality of packets included in the first packet flow. The first packet is a packet that first enters the first channel. The updated first packet is one of the plurality of packets included in the updated first packet flow.

In this application, the first egress node re-sequences the received packet based on a channel identifier and a sequence number of the packet, to resolve a problem of data packet disorder, and improve service performance.

Figure 8:
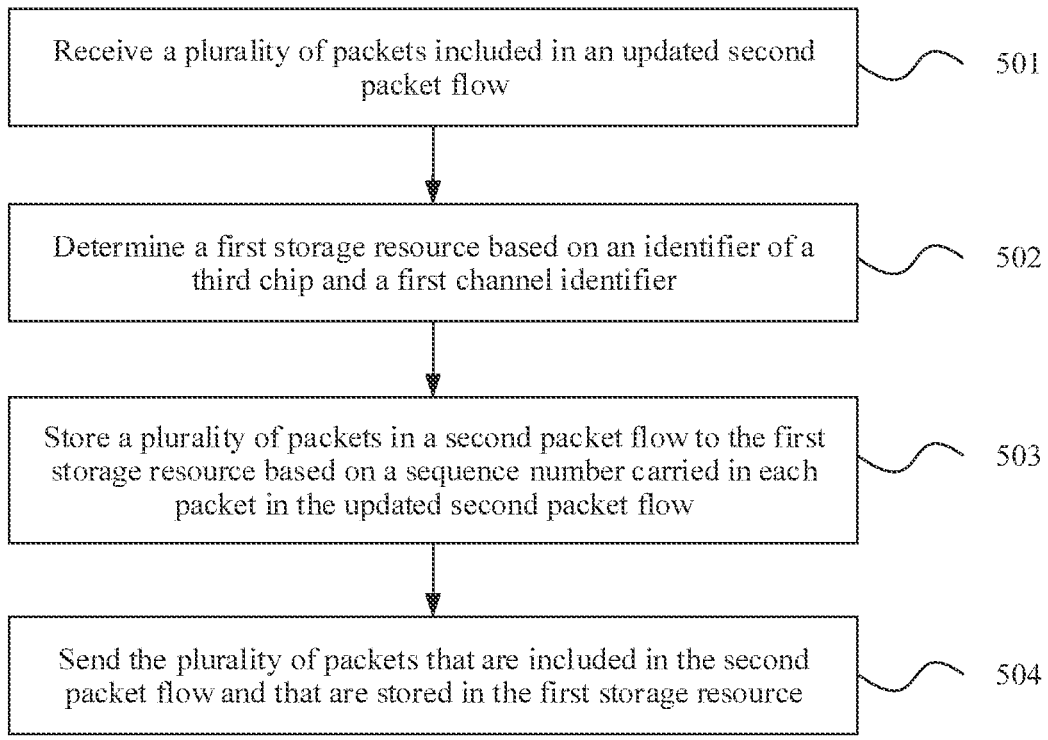
FIG. 8 is a flowchart of Embodiment 2 of a packet re-sequencing method performed on a network according to this application.

FIG. 8 is a flowchart of Embodiment 2 of a packet re-sequencing method performed on a network according to this application. The method shown in FIG. 8 cooperates with the method shown in FIG. 4 to transmit a plurality of packets included in a second packet flow sent by a second host 50 to a host (for example, a third host 60) connected to a first chip 21. Specifically, a first ingress node 10 may send a plurality of packets in an updated second packet flow to a first egress node 20 according to the method shown in FIG. 4. The first egress node 20 may receive, according to the method shown in FIG. 8, the plurality of packets included in the updated second packet flow. As shown in FIG. 8, the method in this embodiment is applied to the network shown in FIG. 1. The method is performed by the first egress node, and the method shown in FIG. 8 may include steps 501 to 504.

Step 501: Receive a plurality of packets included in an updated second packet flow.

Each packet includes an identifier of a third chip, a first channel identifier, and a sequence number. The third chip is a chip that is on the first ingress node and that is configured to receive the second packet flow. The updated second packet flow is obtained based on the second packet flow. The plurality of packets included in the updated second packet flow are in a one-to-one correspondence with the plurality of packets included in the second packet flow. Each packet in the updated second packet flow further includes a corresponding packet in the second packet flow.

In this embodiment, a source chip of the updated second packet flow is the third chip, and the updated second packet flow and the foregoing updated first packet flow come from different chips.

Step 502: Determine a first storage resource based on an identifier of a third chip and a first channel identifier.

A principle of this step is similar to that of step 402 in the foregoing method embodiment, and details are not described herein again.

Step 503: Store the plurality of packets in the updated second packet flow to the first storage resource based on a sequence number carried in each packet in the updated second packet flow.

A location of a packet that is with a small sequence number and that is in the first storage resource precedes a location of a packet that is with a large sequence number and that is in the first storage resource.

In this embodiment, locations of the plurality of packets that are in the second packet flow and that are in the first storage resource are different from locations of a plurality of packets that are in a first packet flow and that are in the first storage resource.

Step 504: Send the plurality of packets that are included in the second packet flow and that are stored in the first storage resource.

A packet stored at a front location of the first storage resource is sent before a packet stored at a rear location of the first storage resource.

A principle of this step is similar to that of step 404 in the foregoing method embodiment, and details are not described herein again.

Figure 9:
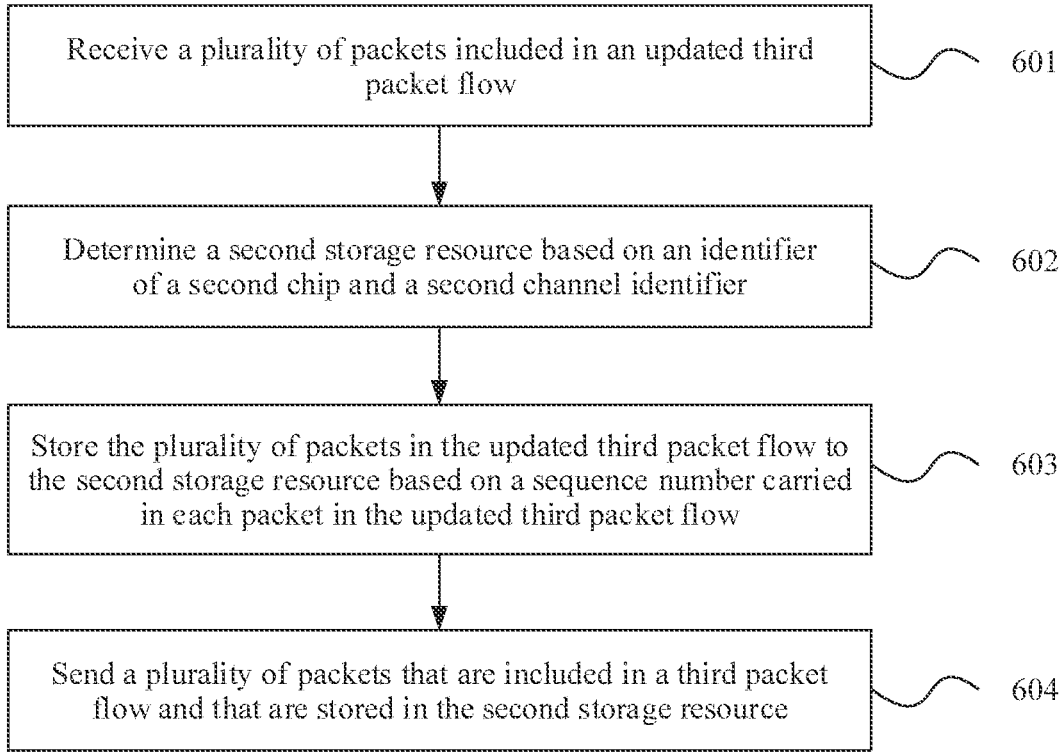
FIG. 9 is a flowchart of Embodiment 3 of a packet re-sequencing method performed on a network according to this application.

FIG. 9 is a flowchart of Embodiment 3 of a packet re-sequencing method performed on a network according to this application. The method shown in FIG. 9 cooperates with the method shown in FIG. 5 to transmit a plurality of packets included in an updated third packet flow sent by a first host 40 to a host (for example, a fourth host 70) connected to a fourth chip 22. Specifically, a first ingress node 10 may send the plurality of packets in the updated third packet flow to a first egress node 20 according to the method shown in FIG. 5. The first egress node 20 may receive, according to the method shown in FIG. 9, the plurality of packets included in the updated third packet flow. As shown in FIG. 9, the method in this embodiment is applied to the network shown in FIG. 1, and is performed by the first egress node. The method shown in FIG. 9 may include steps 601 to 604.

Step 601: Receive a plurality of packets included in an updated third packet flow.

Each packet includes an identifier of a second chip, a second channel identifier, and a sequence number. Each sequence number is used to indicate a sequence number of a corresponding packet entering a second channel. The second channel identifier is used to indicate the second channel. The updated third packet flow is obtained based on a third packet flow. The plurality of packets included in the updated third packet flow are in a one-to-one correspondence with a plurality of packets included in the third packet flow. Each packet in the updated third packet flow further includes a corresponding packet in the third packet flow.

In this embodiment, a source chip of the updated third packet flow is a second chip, and the updated third packet flow and the foregoing updated first packet flow come from a same chip, but have different destination chips.

Step 602: Determine a second storage resource based on an identifier of a second chip and a second channel identifier.

A difference between this step and step 402 in the foregoing method embodiment is that the storage resource determined by the first egress node for the second packet flow is different from the foregoing first storage resource because channel identifiers are different.

Step 603: Store the plurality of packets in the updated third packet flow to the second storage resource based on a sequence number carried in each packet in the updated third packet flow.

A location of a packet that is with a small sequence number and that is in the second storage resource precedes a location of a packet that is with a large sequence number and that is in the second storage resource.

A principle of this step is similar to that of step 403 in the foregoing method embodiment, and details are not described herein again.

Step 604: Send a plurality of packets that are included in a third packet flow and that are stored in the second storage resource.

A packet stored at a front location of the second storage resource is sent before a packet stored at a rear location of the second storage resource.

A principle of this step is similar to that of step 404 in the foregoing method embodiment, and details are not described herein again.

According to the foregoing technical solutions, when a quantity of available storage resources corresponding to a chip that is on the first egress node and that is configured to receive the updated first packet flow is less than a third threshold, the first egress node sends a first message. The first message (for example, a broadcast message) is used to notify the second chip or another chip to stop sending a packet to the chip configured to receive the updated first packet flow in a per-packet load sharing manner. Alternatively, after the first egress node notifies the second chip or the another chip to stop sending the packet to the chip configured to receive the updated first packet flow in the per-packet load sharing manner, when the first egress node determines that the quantity of available storage resources corresponding to the chip that is on the first egress node and that is configured to receive the updated first packet flow is greater than a fourth threshold, the first egress node sends a second message. The second message (for example, the broadcast message) is used to notify the second chip or the another chip to send a packet to the chip configured to receive the updated first packet flow in the per-packet load sharing manner.

According to the foregoing technical solutions, if no packet is stored in the first storage resource within third duration, the first egress node sets a state of the first storage resource to idle, and sets information stored in a memory corresponding to the first storage resource to zero. Alternatively, if no packet is stored in a plurality of storage resources corresponding to the third chip within fourth duration, the first egress node sets states of the plurality of storage resources to idle, and sets information stored in the memory corresponding to the plurality of storage resources to zero.

In this application, the first storage resource (the first storage resource is allocated to the first channel) is a storage resource used to re-sequence a packet. The memory is a memory configured to store context information of the first channel. The first storage resource and the memory are not necessarily associated.

In a possible implementation, this application provides a route advertisement method on a network. The method is applied to the network shown in FIG. 1, and is performed by a first egress node. The first egress node generates first routing information, and the first routing information includes an address of a host connected to the first egress node through a first chip and an identifier of the first chip. The first egress node includes the first chip, and the first egress node sends the first routing information to a first ingress node.

In addition, the first egress node may further generate second routing information. The second routing information includes an address of a host connected to the first egress node through a second chip and an identifier of the second chip. The first egress node includes the second chip, and the first egress node sends the second routing information to the first ingress node.

The first routing information and the second routing information may further include information used to indicate that the first chip or the second chip has a re-sequencing capability.

Figure 10:
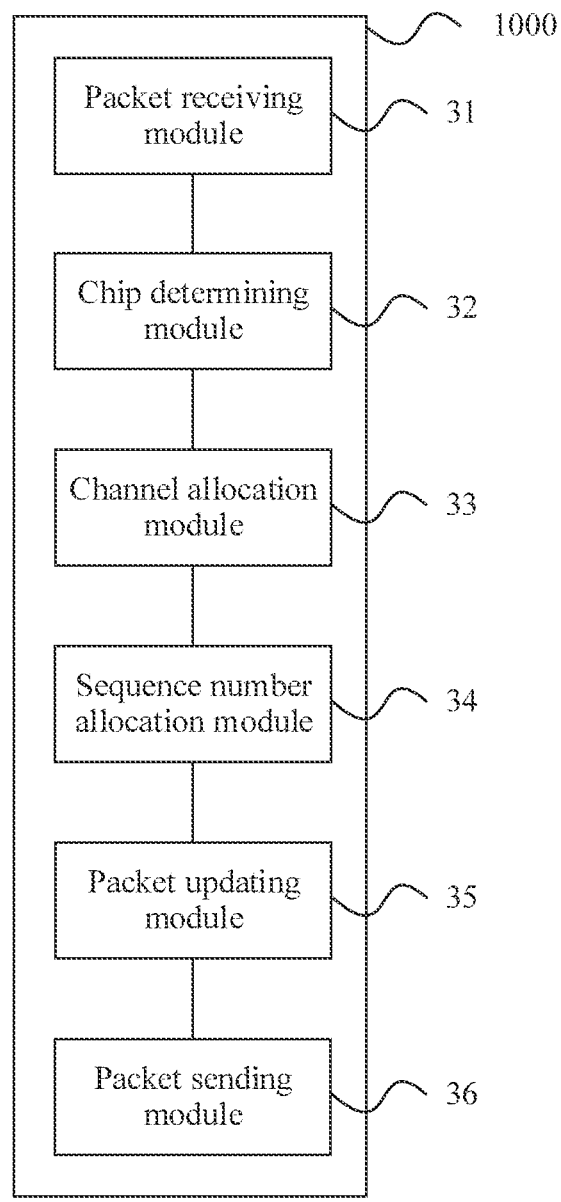
FIG. 10 is a schematic structural diagram of an embodiment of a load balancing apparatus performed on a network according to this application.

FIG. 10 is a schematic structural diagram of an embodiment of a load balancing apparatus performed on a network according to this application. The network includes a first ingress node, a first egress node, and at least one intermediate node. The first ingress node is connected to the first egress node through the at least one intermediate node. The apparatus shown in FIG. 10 may be the first ingress node. The apparatus shown in FIG. 10 may be configured to perform the method shown in any one of FIG. 2 to FIG. 5. For a specific implementation of the apparatus shown in FIG. 10, refer to the description of any one of FIG. 2 to FIG. 5 in the embodiments. Details are not described herein again.

Referring to FIG. 10, the apparatus 1000 includes a packet receiving module 31, a chip determining module 32, a channel allocation module 33, a sequence number allocation module 34, a packet updating module 35, and a packet sending module 36. The first packet receiving module 31 is configured to receive a plurality of packets included in a first packet flow. A destination address of the first packet flow is an address of a host connected to the first egress node through a first chip. The first egress node includes the first chip. The chip determining module 32 is configured to determine an identifier of the first chip based on the first packet flow and a first entry in a forwarding table. The first entry includes the destination address of the first packet flow and the identifier of the first chip. The channel allocation module 33 is configured to allocate a first channel identifier to the first packet flow based on the identifier of the first chip. The sequence number allocation module 34 is configured to allocate a sequence number to each of the plurality of packets included in the first packet flow. Each sequence number is used to indicate a sequence in which a corresponding packet enters a first channel. The first channel identifier is used to indicate the first channel. The first channel is one of a plurality of channels between the first ingress node and the first chip. The packet updating module 35 is configured to generate an updated first packet flow based on the first packet flow. The updated first packet flow includes a plurality of packets. The plurality of packets included in the updated first packet flow are in a one-to-one correspondence with the plurality of packets included in the first packet flow. Each packet in the updated first packet flow includes a corresponding packet in the first packet flow, a sequence number of the corresponding packet in the first packet flow, and the first channel identifier. The packet sending module 36 is configured to send the plurality of packets in the updated first packet flow to the first egress node in a per-packet load sharing manner.

According to the foregoing technical solution, the packet receiving module 31 is further configured to receive a plurality of packets included in a second packet flow. A destination address of the second packet flow is an address of a host connected to the first egress node through the first chip. The chip determining module 32 is further configured to determine the identifier of the first chip based on the second packet flow and a second entry in the forwarding table. The second entry includes the destination address of the second packet flow and the identifier of the first chip. The channel allocation module 33 is further configured to allocate the first channel identifier to the second packet flow based on the identifier of the first chip. The sequence number allocation module 34 is further configured to allocate a sequence number to each of the plurality of packets included in the second packet flow. Each sequence number is used to indicate a sequence in which a corresponding packet enters the first channel. The packet updating module 35 is further configured to generate an updated second packet flow based on the second packet flow. The updated second packet flow includes a plurality of packets. The plurality of packets included in the updated second packet flow are in a one-to-one correspondence with the plurality of packets included in the second packet flow. Each packet in the updated second packet flow includes a corresponding packet in the second packet flow, a sequence number of the corresponding packet in the second packet flow, and the first channel identifier. The packet sending module 36 is further configured to send the plurality of packets in the updated second packet flow to the first egress node in the per-packet load sharing manner.

According to the foregoing technical solution, each packet in the updated first packet flow further includes an identifier of a chip that is on the first ingress node and that is configured to receive the first packet flow. The first channel is one of a plurality of channels between the first chip and the chip that is on the first ingress node and that is configured to receive the first packet flow.

Based on the foregoing technical solution, the channel allocation module 33 is further configured to, when the first ingress node detects that a rate of a packet transmitted on the first channel is greater than a first threshold, allocate another channel identifier to the first packet flow. The another channel identifier is used to indicate another channel. The another channel is one of the plurality of channels between the first ingress node and the first chip, and the another channel is different from the first channel.

According to the foregoing technical solution, the channel allocation module 33 is specifically configured to determine, for the first packet flow, an identifier of a channel whose rate is lower than a second threshold as the another channel identifier.

According to the foregoing technical solution, the sequence number allocation module 34 is further configured to allocate a sequence number to each of a plurality of newly received packets included in the first packet flow. Each sequence number is used to indicate a sequence in which a corresponding packet enters the another channel. A minimum sequence number corresponding to the plurality of newly received packets in the first packet flow is 0. The packet sending module is further configured to, when sending the plurality of newly received packets in the first packet flow to the first chip, add indication information to each of the plurality of newly received packets in the first packet flow. The indication information is used to indicate that the minimum sequence number corresponding to the plurality of newly received packets in the first packet flow is 0.

According to the foregoing technical solution, the channel allocation module 33 is further configured to, if the first ingress node does not receive, within first duration, traffic that needs to be sent to the first chip through the first channel, set a state of the first channel to idle, and set information stored in a memory corresponding to the first channel identifier to zero. Alternatively, the channel allocation module 33 is further configured to, if the first ingress node does not receive, within second duration, traffic that needs to be sent to the first chip through the plurality of channels between the first ingress node and the first chip, set states of the plurality of channels to idle, and set information stored in the memory corresponding to the identifier of the first chip to zero.

The apparatus in this embodiment may be used in the technical solution of the foregoing method embodiment. Implementation principles and technical effects of the apparatus are similar to those of the method embodiment, and are not described herein again.

Figure 11:
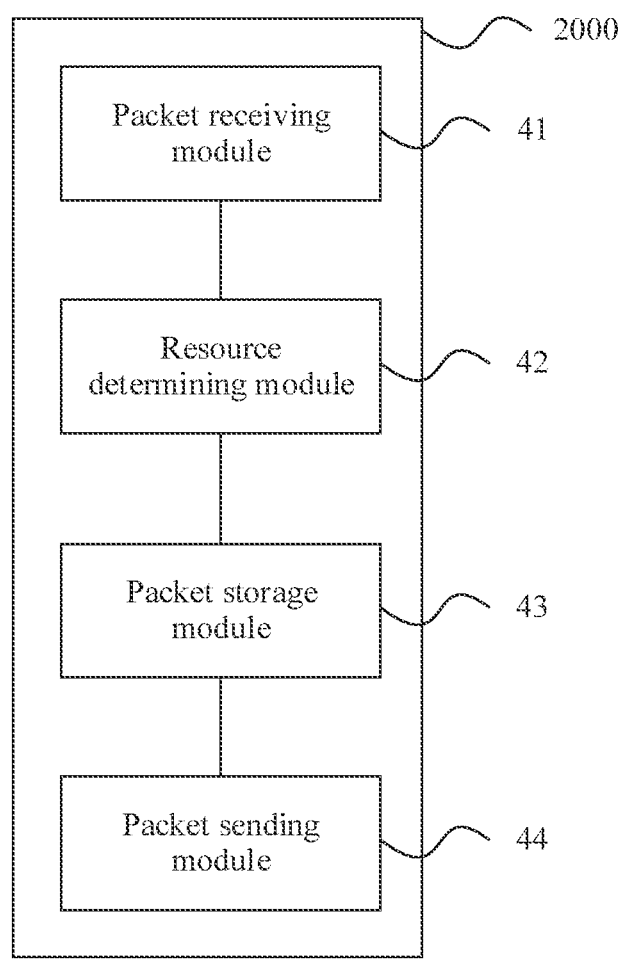
FIG. 11 is a schematic structural diagram of Embodiment 1 of a packet re-sequencing apparatus performed on a network according to this application.

FIG. 11 is a schematic structural diagram of Embodiment 1 of a packet re-sequencing apparatus performed on a network according to this application. The network includes a first ingress node, a first egress node, and at least one intermediate node. The first ingress node is connected to the first egress node through the at least one intermediate node. The apparatus shown in FIG. 11 may be the first egress node. The apparatus shown in FIG. 11 may be configured to perform the method shown in any one of FIG. 6 to FIG. 9. For a specific implementation of the apparatus shown in FIG. 11, refer to the description of any one of FIG. 6 to FIG. 9 in the embodiments. Details are not described herein again.

Referring to FIG. 11, the apparatus 2000 includes a packet receiving module 41, a resource determining module 42, a packet storage module 43, and a packet sending module 44. The packet receiving module 41 is configured to receive a plurality of packets included in an updated first packet flow. Each packet includes an identifier of a second chip, a first channel identifier, and a sequence number. Each sequence number is used to indicate a sequence number of a corresponding packet entering a first channel. The first channel identifier is used to indicate the first channel. The second chip is a chip that is on the first ingress node and that is configured to receive a first packet flow. The updated first packet flow is obtained based on the first packet flow. The plurality of packets included in the updated first packet flow are in a one-to-one correspondence with a plurality of packets included in the first packet flow. Each packet in the updated first packet flow further includes a corresponding packet in the first packet flow. The first channel is one of a plurality of channels between the second chip and the first egress node. The resource determining module 42 is configured to determine a first storage resource based on the identifier of the second chip and the first channel identifier. The packet storage module 43 is configured to store the plurality of packets in the first packet flow to the first storage resource based on the sequence number carried in each packet in the updated first packet flow. A location of a packet with a small sequence number in the first storage resource precedes a location of a packet with a large sequence number in the first storage resource. The packet sending module 44 is configured to send the plurality of packets that are included in the first packet flow and that are stored in the first storage resource. A packet stored at a front location of the first storage resource is sent before a packet stored at a rear location of the first storage resource.

According to the foregoing technical solution, the packet receiving module 41 is further configured to receive a plurality of packets included in an updated second packet flow. Each packet includes an identifier of a third chip, the first channel identifier, and a sequence number. The third chip is a chip that is on the first ingress node and that is configured to receive a second packet flow. The updated second packet flow is obtained based on the second packet flow. The plurality of packets included in the updated second packet flow are in a one-to-one correspondence with a plurality of packets included in the second packet flow. Each packet in the updated second packet flow further includes a corresponding packet in the second packet flow. The resource determining module 42 is further configured to determine the first storage resource based on the identifier of the third chip and the first channel identifier. The packet storage module 43 is further configured to store the plurality of packets in the second packet flow to the first storage resource based on the sequence number carried in each packet in the updated second packet flow. A location of a packet with a small sequence number in the first storage resource precedes a location of a packet with a large sequence number in the first storage resource. The packet sending module 44 is further configured to send the plurality of packets that are included in the second packet flow and that are stored in the first storage resource. A packet stored at a front location of the first storage resource is sent before a packet stored at a rear location of the first storage resource.

According to the foregoing technical solution, the packet sending module 44 is specifically configured to, when determining that a sequence number carried in an updated first packet is the same as a sequence number of a first storage unit of the first storage resource, send a first packet when the plurality of packets included in the first packet flow are not all stored in the first storage resource. The first packet is one of the plurality of packets included in the first packet flow. The first packet is a packet that first enters the first channel. The updated first packet is one of the plurality of packets included in the updated first packet flow.

Figure 12:
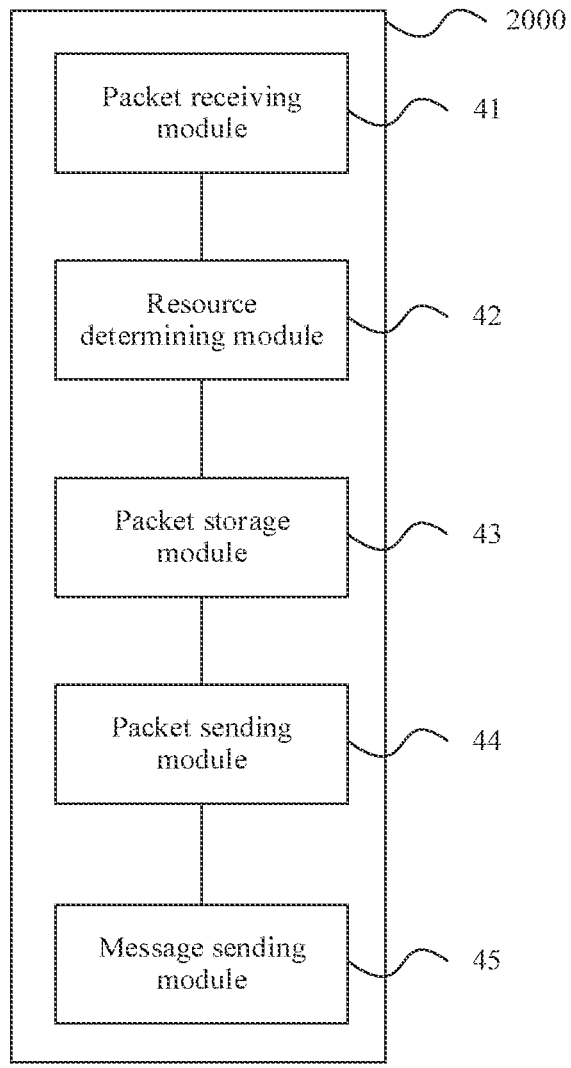
FIG. 12 is a schematic structural diagram of Embodiment 2 of a packet re-sequencing apparatus performed on a network according to this application.

According to the foregoing technical solution, FIG. 12 is a schematic structural diagram of Embodiment 2 of a packet re-sequencing apparatus performed on a network according to this application. As shown in FIG. 12, the apparatus 2000 further includes a message sending module 45. The message sending module 45 is configured to send a first message when a quantity of available storage resources corresponding to a chip that is on the first egress node and that is configured to receive the updated first packet flow is less than a third threshold. The first message is used to notify the second chip to stop sending a packet to the chip configured to receive the updated first packet flow in a per-packet load sharing manner. Alternatively, the message sending module 45 is configured to, after notifying the second chip to stop sending the packet to the chip configured to receive the updated first packet flow in the per-packet load sharing manner, send a second message when the first egress node determines that the quantity of available storage resources corresponding to the chip that is on the first egress node and that receives the updated first packet flow is greater than a fourth threshold. The second message is used to notify the second chip to send the packet to the chip configured to receive the updated first packet flow in the per-packet load sharing manner.

According to the foregoing technical solution, the resource determining module 42 is further configured to, if no packet is stored in the first storage resource within third duration, set a state of the first storage resource to idle, and set information stored in a memory corresponding to the first storage resource to zero. Alternatively, the resource determining module 42 is further configured to, if no packet is stored in a plurality of storage resources corresponding to the third chip within fourth duration, set states of the plurality of storage resources to idle, and set information stored in the memory corresponding to the plurality of storage resources to zero.

The apparatus in this embodiment may be used in the technical solution of the foregoing method embodiment. Implementation principles and technical effects of the apparatus are similar to those of the method embodiment, and are not described herein again.

Figure 13:
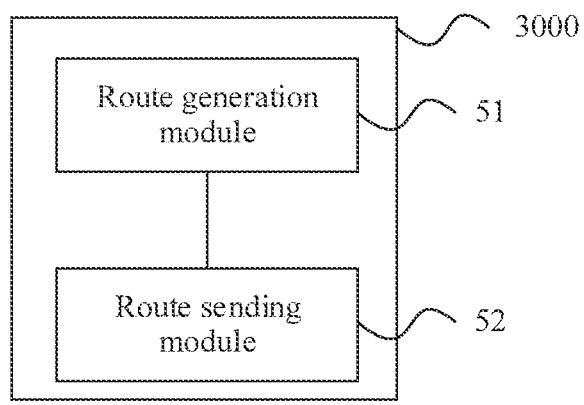
FIG. 13 is a schematic structural diagram of an embodiment of a route advertisement apparatus on a network according to this application.

FIG. 13 is a schematic structural diagram of an embodiment of a route advertisement apparatus on a network according to this application. The network includes a first ingress node, a first egress node, and at least one intermediate node. The first ingress node is connected to the first egress node through the at least one intermediate node. The apparatus shown in FIG. 13 may be the first egress node. The apparatus shown in FIG. 13 may be configured to perform the foregoing route advertisement method on a network. For a specific implementation of the apparatus shown in FIG. 13, refer to the description of the route advertisement method on the network in the embodiment. Details are not described herein again.

Referring to FIG. 13, the apparatus 3000 includes a route generation module 51 and a route sending module 52. The route generation module 51 is configured to generate first routing information. The first routing information includes an address of a host connected to the first egress node through a first chip and an identifier of the first chip, and the first egress node includes the first chip. The route sending module 52 is configured to send the first routing information to the first ingress node.

The first routing information further includes information used to indicate that the first chip has a re-sequencing capability.

According to the foregoing technical solution, the route generation module 51 is further configured to generate second routing information. The second routing information includes an address of a host connected to the first egress node through a second chip and an identifier of the second chip, and the first egress node includes the second chip. The route sending module 52 is further configured to send the second routing information to the first ingress node.

The second routing information further includes information used to indicate that the second chip has the re-sequencing capability.

The apparatus in this embodiment may be used in the technical solution of the foregoing method embodiment. Implementation principles and technical effects of the apparatus are similar to those of the method embodiment, and are not described herein again.

Figure 14:
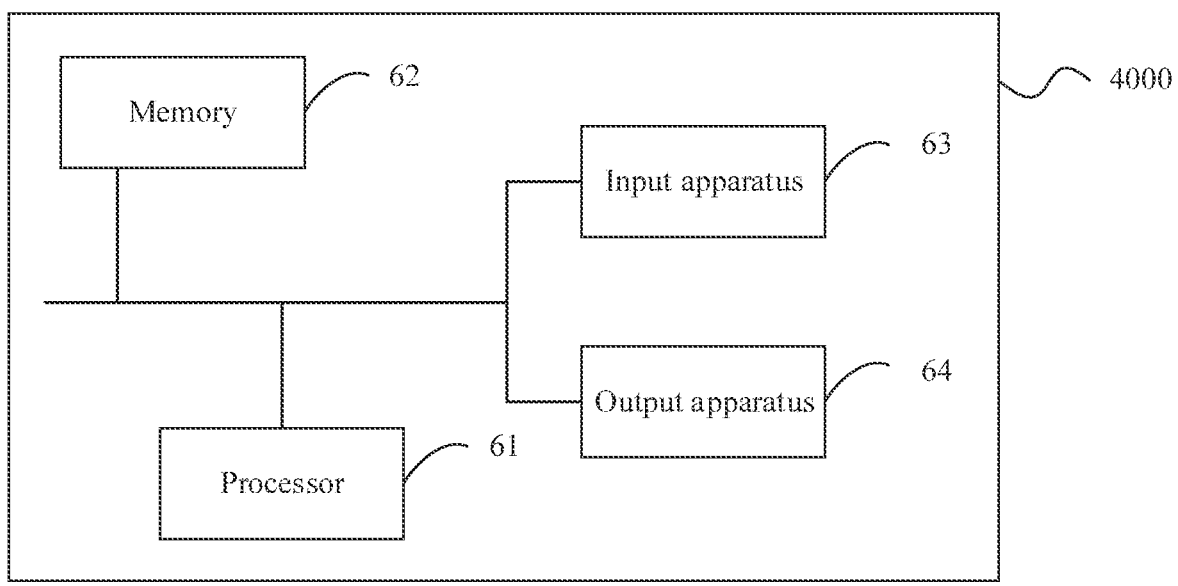
FIG. 14 is a schematic structural diagram of an embodiment of a network node according to this application.

FIG. 14 is a schematic structural diagram of an embodiment of a network node according to this application. As shown in FIG. 14, the network node 4000 includes a processor 61, a memory 62, an input apparatus 63, and an output apparatus 64. There may be one or more processors 61 on the network node. In FIG. 14, one processor 61 is used as an example. The processor 61, the memory 62, the input apparatus 63, and the output apparatus 64 on the network node may be connected through a bus or in another manner. In FIG. 14, an example in which the processor 61, the memory 62, the input apparatus 63, and the output apparatus 64 are connected through the bus is used.

As a computer-readable storage medium, the memory 62 may be configured to store a software program, a computer-executable program, and a module, for example, a program instruction/module corresponding to the method in the embodiment of this application. By running the software program, the instruction, and the module that are stored in the memory 62, the processor 61 executes various function applications of the network node and performs data processing, that is, implements the foregoing method.

The memory 62 may mainly include a program storage area and a data storage area. The program storage area may store an operating system and an application program required by at least one function. The data storage area may store data created based on use of a terminal, and the like. In addition, the memory 62 may include a high-speed random-access memory (RAM), and may further include a non-volatile memory, for example, at least one magnetic disk storage device, a flash memory device, or another non-volatile solid-state storage device. In some examples, the memory 62 may further include memories that are remotely disposed relative to the processor 61, and these remote memories may be connected to the network node over a network. Examples of the foregoing network include but are not limited to the internet, an intranet, a local area network, a mobile communications network, and a combination thereof.

The input apparatus 63 may be configured to receive input digit or character information, and generate key signal input related to user settings and function control of the network node. The output apparatus 64 may include a display device such as a display screen.

The network node may be the first ingress node or the first egress node in the embodiment of the network shown in FIG. 1.

In a possible implementation, this application provides a computer-readable storage medium. The computer-readable storage medium stores a computer program. The computer program includes at least one portion of code. The at least one portion of code may be executed by a computer, to control the computer to perform the technical solutions in the foregoing method embodiments.

In a possible implementation, this application provides a computer program. When being executed by a computer, the computer program is used to perform the technical solutions in the foregoing method embodiments.

In the several embodiments provided in this application, it should be understood that the disclosed apparatus and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present application. The foregoing storage medium includes any medium that can store program code, such as a Universal Serial Bus (USB) flash drive, a removable hard disk, a read-only memory (ROM), a RAM, a magnetic disk, or a compact disc.

It may be clearly understood by a person skilled in the art that, for the purpose of convenient and brief description, division of the foregoing function modules is taken as an example for illustration. In actual application, the foregoing functions can be allocated to different function modules and implemented based on a requirement, in other words, an inner structure of an apparatus is divided into different function modules to implement all or some of the functions described above. For a detailed working process of the foregoing apparatus, refer to a corresponding process in the foregoing method embodiments, and details are not described herein again.

What is claimed is:

1. A load balancing method on a network, implemented by an ingress node of the network, wherein the load balancing method comprises:
   receiving a first plurality of packets comprised in a first packet flow, wherein a first destination address of the first packet flow is an address of a host that is connected to an egress node of the network using a first chip of the egress node;
   determining a first identifier of the first chip based on the first packet flow and a first entry in a forwarding table, wherein the first entry indicates the first destination address and the first identifier;
   allocating a first channel identifier to the first packet flow based on the first identifier;
   allocating a first sequence number to each packet of the first packets, wherein the first sequence number indicates a first sequence in which a first corresponding packet of the first packets enters a first channel, wherein the first channel identifier indicates the first channel, and wherein the first channel is one of a first plurality of channels between the ingress node and the first chip;
   generating an updated first packet flow using the first packet flow, wherein the updated first packet flow comprises a second plurality of packets that correspond to the first packets and a second identifier of a second chip of the ingress node, wherein the second chip receives the first packet flow, and wherein the first channel is one of a second plurality of channels between the first chip and the second chip, and wherein each packet in the updated first packet flow comprises a second corresponding packet in the first packet flow, a second sequence number of the second corresponding packet, and the first channel identifier; and
   sending the second packets to the egress node in a per-packet load sharing manner.

2. The load balancing method of claim 1, further comprising:
   receiving a third plurality of packets comprised in a second packet flow, wherein a second destination address of the second packet flow is of the host;
   determining the first identifier based on the second packet flow and a second entry in the forwarding table, wherein the second entry comprises the second destination address and the first identifier;
   allocating the first channel identifier to the second packet flow based on the first identifier;
   allocating a third sequence number to each of the third packets, wherein the third sequence number indicates a second sequence in which a third corresponding packet enters the first channel;
   generating an updated second packet flow based on the second packet flow, wherein the updated second packet flow comprises a fourth plurality of packets, wherein the fourth packets correspond to the third packets, and wherein each packet in the updated second packet flow comprises a fourth corresponding packet in the second packet flow, a fourth sequence number of the fourth corresponding packet, and the first channel identifier; and
   sending the fourth packets to the egress node in the per-packet load sharing manner.

3. The load balancing method of claim 1, wherein after allocating the first channel identifier to the first packet flow, the method further comprises:
   detecting a first rate of a packet transmission on the first channel; and
   allocating a second channel identifier to the first packet flow when the first rate is greater than a first threshold, wherein the second channel identifier indicates another channel of the first channels, and wherein the other channel is different from the first channel.

4. The load balancing method of claim 3, further comprising determining, for the first packet flow, a third identifier of a third channel that has a second rate that is lower than a second threshold as the second channel identifier.

5. The load balancing method of claim 3, wherein after allocating the second channel identifier to the first packet flow, the method further comprises:
   allocating a fifth sequence number to each of a plurality of newly received packets comprised in the first packet flow, wherein the fifth sequence number indicates a third sequence in which a fifth corresponding packet enters the second channel, and wherein a minimum sequence number corresponding to the newly received packets is 0; and adding indication information to each of the newly received packets when the ingress node sends the newly received packets to the first chip, wherein the indication information indicates that the minimum sequence number corresponding to the newly received packets is 0.

6. The load balancing method of claim 1, wherein after receiving the first packets, the method further comprises:

when the ingress node does not receive, within a first duration, first traffic to be sent to the first chip through the first channel, setting a state of the first channel to idle and setting first information stored in a memory corresponding to the first channel identifier to zero; and when the ingress node does not receive, within a second duration, second traffic to be sent to the first chip through the first channels, setting states of the first channels to idle and setting second information stored in the memory corresponding to the first identifier to zero.

7. A load balancing apparatus, comprising:

a processor; and a memory coupled to the processor and configured to store instructions that, when executed by the processor, cause the load balancing apparatus to:

receive a first plurality of packets comprised in a first packet flow, wherein a first destination address of the first packet flow is an address of a host that is connected to an egress node of a network using a first chip of the egress node;

determine a first identifier of the first chip based on the first packet flow and a first entry in a forwarding table, wherein the first entry indicates the first destination address and the first identifier;

allocate a first channel identifier to the first packet flow based on the first identifier;

allocate a first sequence number to each of the first packets, wherein the first sequence number indicates a first sequence in which a first corresponding packet enters a first channel, wherein the first channel identifier indicates the first channel, and wherein the first channel is one of a first plurality of channels between an ingress node of the network and the first chip;

generate an updated first packet flow based on the first packet flow, wherein the updated first packet flow comprises a second plurality of packets that correspond to the first packets and a second identifier of a second chip of the ingress node, wherein the second chip receives the first packet flow, and wherein the first channel is one of a second plurality of channels between the first chip and the second chip, and wherein each packet in the updated first packet flow comprises a second corresponding packet in the first packet flow, a second sequence number of the second corresponding packet, and the first channel identifier; and send the second packets to the egress node in a per-packet load sharing manner.

8. The load balancing apparatus of claim 7, wherein the instructions further cause the load balancing apparatus to:

receive a third plurality of packets comprised in a second packet flow, wherein a second destination address of the second packet flow is of the host;

determine the first identifier based on the second packet flow and a second entry in the forwarding table, wherein the second entry comprises the second destination address and the first identifier;

allocate the first channel identifier to the second packet flow based on the first identifier;

allocate a third sequence number to each of the third packets, wherein the third sequence number indicates a second sequence in which a third corresponding packet enters the first channel;

generate an updated second packet flow based on the second packet flow, wherein the updated second packet flow comprises a fourth plurality of packets, the fourth packets correspond to the third packets, and wherein each packet in the updated second packet flow comprises a fourth corresponding packet in the second packet flow, a fourth sequence number of the fourth corresponding packet, and the first channel identifier; and send the fourth packets to the egress node in the per-packet load sharing manner.

9. The load balancing apparatus of claim 7, wherein the instructions further cause the load balancing apparatus to:

detect a rate of a packet transmission on the first channel; and allocate a second channel identifier to the first packet flow when the rate is greater than a threshold, wherein the second channel identifier indicates a second channel, wherein the second channel is one of the first channels, and wherein the second channel is different from the first channel.

10. The load balancing apparatus of claim 9, wherein the instructions further cause the load balancing apparatus to determine, for the first packet flow, a third identifier of a third channel that has a second rate that is lower than a second threshold as the second channel identifier.

11. The load balancing apparatus of claim 9, wherein after allocating the second channel identifier to the first packet flow, the instructions further cause the load balancing apparatus to:

allocate a fifth sequence number to each of a plurality of newly received packets comprised in the first packet flow, wherein the fifth sequence number indicates a third sequence in which a fifth corresponding packet enters the second channel, and wherein a minimum sequence number corresponding to the newly received packets is 0; and add indication information to each of the newly received packets when the ingress node sends the newly received packets to the first chip, wherein the indication information indicates that the minimum sequence number corresponding to the newly received packets is 0.

12. The load balancing apparatus of claim 7, wherein after receiving the first packets, the instructions further cause the load balancing apparatus to:

when the ingress node does not receive, within a first duration, first traffic to be sent to the first chip through the first channel, set a state of the first channel to idle and setting first information stored in a memory corresponding to the first channel identifier to zero; and when the ingress node does not receive, within a second duration, second traffic to be sent to the first chip through the first channels, set states of the first channels to idle and setting second information stored in the memory corresponding to the first identifier to zero.

13. A computer program product comprising computer-executable instructions that are stored on a non-transitory computer-readable storage medium and that, when executed by a processor, cause a load balancing apparatus to:
receive a first plurality of packets comprised in a first packet flow, wherein a first destination address of the first packet flow is an address of a host that is connected to an egress node of a network using a first chip of the egress node;
determine a first identifier of the first chip based on the first packet flow and a first entry in a forwarding table, wherein the first entry indicates the first destination address and the first identifier;
allocate a first channel identifier to the first packet flow based on the first identifier;
allocate a first sequence number to each of the first packets, wherein the first sequence number indicates a first sequence in which a first corresponding packet enters a first channel, wherein the first channel identifier indicates the first channel, and wherein the first channel is one of a first plurality of channels between an ingress node of the network and the first chip;
generate an updated first packet flow based on the first packet flow, wherein the updated first packet flow comprises a second plurality of packets that correspond to the first packets and a second identifier of a second chip of the ingress node, wherein the second chip receives the first packet flow, and wherein the first channel is one of a second plurality of channels between the first chip and the second chip, and wherein each packet in the updated first packet flow comprises a second corresponding packet in the first packet flow, a second sequence number of the second corresponding packet, and the first channel identifier; and
send the second packets to the egress node in a per-packet load sharing manner.

14. The computer program product of claim 13, wherein the computer-executable instructions further cause the load balancing apparatus to:
receive a third plurality of packets comprised in a second packet flow, wherein a second destination address of the second packet flow is of the host;
determine the first identifier based on the second packet flow and a second entry in the forwarding table, wherein the second entry comprises the second destination address and the first identifier;
allocate the first channel identifier to the second packet flow based on the first identifier;
allocate a third sequence number to each of the third packets, wherein the third sequence number indicates a second sequence in which a third corresponding packet enters the first channel;
generate an updated second packet flow based on the second packet flow, wherein the updated second packet flow comprises a fourth plurality of packets, the fourth packets correspond to the third packets, and wherein each packet in the updated second packet flow comprises a fourth corresponding packet in the second packet flow, a fourth sequence number of the fourth corresponding packet, and the first channel identifier; and
send the fourth packets to the egress node in the per-packet load sharing manner.

15. The computer program product of claim 13, wherein the instructions further cause the load balancing apparatus to:
detect a rate of a packet transmission on the first channel; and
allocate a second channel identifier to the first packet flow when the rate is greater than a threshold, wherein the second channel identifier indicates a second channel, wherein the second channel is one of the first channels, and wherein the second channel is different from the first channel.

16. The computer program product of claim 15, wherein the computer-executable instructions further cause the load balancing apparatus to determine, for the first packet flow, a third identifier of a third channel that has a second rate that is lower than a second threshold as the second channel identifier.

17. The computer program product of claim 15, wherein after allocating the second channel identifier to the first packet flow, the computer-executable instructions further cause the load balancing apparatus to:
allocate a fifth sequence number to each of a plurality of newly received packets comprised in the first packet flow, wherein the fifth sequence number indicates a third sequence in which a fifth corresponding packet enters the second channel, and wherein a minimum sequence number corresponding to the newly received packets is 0; and
add indication information to each of the newly received packets when the ingress node sends the newly received packets to the first chip, wherein the indication information indicates that the minimum sequence number corresponding to the newly received packets is 0.

18. The computer program product of claim 13, wherein after receiving the first packets, the computer-executable instructions further cause the load balancing apparatus to:
when the ingress node does not receive, within a first duration, first traffic to be sent to the first chip through the first channel, set a state of the first channel to idle and setting first information stored in a memory corresponding to the first channel identifier to zero; and
when the ingress node does not receive, within a second duration, second traffic to be sent to the first chip through the first channels, set states of the first channels to idle and setting second information stored in the memory corresponding to the first identifier to zero.

* * * * *